US011189257B2

(12) United States Patent
Arefti et al.

(10) Patent No.: US 11,189,257 B2
(45) Date of Patent: Nov. 30, 2021

(54) SELF-CONTAINED, SAFETY-CONFIRMING JUKEBOX CHASSIS AND ENCLOSURE

(71) Applicant: TouchTunes Music Corporation, New York, NY (US)

(72) Inventors: Vitalie Arefti, Laval (CA); Michel Bryant, Laval (CA); Jean Gauthier, Sainte-Therese (CA); Leo Maheu, Montreal (CA); Daniel Hamric, Lake in the Hills, IL (US); Michael Tooker, Montreal (CA)

(73) Assignee: TOUCHTUNES MUSIC CORPORATION, New York, NY (US)

( * ) Notice: Subject to any disclaimer, the term of this patent is extended or adjusted under 35 U.S.C. 154(b) by 0 days.

(21) Appl. No.: 16/437,609

(22) Filed: Jun. 11, 2019

(65) Prior Publication Data
US 2019/0378485 A1    Dec. 12, 2019

Related U.S. Application Data

(60) Provisional application No. 62/683,047, filed on Jun. 11, 2018.

(51) Int. Cl.
*G10H 1/32* (2006.01)
*G10H 1/00* (2006.01)
*G07F 17/30* (2006.01)
*G07C 9/00* (2020.01)

(52) U.S. Cl.
CPC .......... *G10H 1/32* (2013.01); *G07C 9/00896* (2013.01); *G07F 17/30* (2013.01); *G10H 1/0008* (2013.01); *G10H 2220/096* (2013.01)

(58) Field of Classification Search
CPC .. G10H 1/32; G10H 1/0008; G10H 2220/096; G07C 9/00896; G07F 17/30
USPC ............................................................ 84/644
See application file for complete search history.

(56) References Cited

U.S. PATENT DOCUMENTS

| 4,633,452 | A | * | 12/1986 | Shimbo | G11B 17/30 |
| | | | | | 369/30.83 |
| D327,686 | S | * | 7/1992 | Arbiter | D14/173 |
| 5,481,509 | A | * | 1/1996 | Knowles | G07F 17/305 |
| | | | | | 369/30.03 |
| 6,779,904 | B1 | * | 8/2004 | Dyk | G07F 17/305 |
| | | | | | 362/276 |
| 6,994,230 | B2 | * | 2/2006 | Sams | G07F 11/42 |
| | | | | | 194/202 |
| D686,591 | S | * | 7/2013 | Garneau | D14/173 |
| D704,160 | S | * | 5/2014 | Garneau | D14/172 |
| D734,735 | S | * | 7/2015 | Tooker | D14/172 |
| D765,052 | S | * | 8/2016 | Garneau | D14/173 |
| 10,318,027 | B2 | * | 6/2019 | Beaumier | G07F 17/305 |

(Continued)

*Primary Examiner* — Jeffrey Donels
*Assistant Examiner* — Christina M Schreiber
(74) *Attorney, Agent, or Firm* — Nixon & Vanderhye, PC

(57) ABSTRACT

A wall-mountable jukebox and cover assembly in which a jukebox chassis is exposed by the cover in a display screen and in one or more payment receptors for pay-for-play payment collection devices. The jukebox chassis and cover are designed to enable the jukebox chassis to detachably slide-on to the cover. Various securing mechanisms and access mechanisms may be configured. The jukebox and cover assembly is configured for use in commercial venues and can be customized to each location.

20 Claims, 22 Drawing Sheets

(56) References Cited

U.S. PATENT DOCUMENTS

| | | | | |
|---|---|---|---|---|
| 2002/0188363 A1* | 12/2002 | Ashy | .................. | H04N 21/6582 |
| | | | | 700/94 |
| 2003/0127300 A1* | 7/2003 | Greim | ...................... | G07D 7/00 |
| | | | | 194/302 |
| 2006/0153020 A1* | 7/2006 | Johnson | ................ | G11B 27/002 |
| | | | | 369/30.06 |
| 2007/0221034 A1* | 9/2007 | Pigoski | ................. | G07F 17/305 |
| | | | | 84/1 |
| 2007/0247979 A1* | 10/2007 | Brilion | ................. | G11B 19/025 |
| | | | | 369/30.06 |
| 2008/0168807 A1* | 7/2008 | Dion | ................... | G07F 17/3223 |
| | | | | 70/94 |
| 2009/0118849 A1* | 5/2009 | Dery | ...................... | G03B 17/53 |
| | | | | 700/94 |
| 2012/0146893 A1* | 6/2012 | Maas | .................. | G07F 17/3216 |
| | | | | 345/156 |
| 2012/0208640 A1* | 8/2012 | Ceccoli | ............... | G07F 17/3204 |
| | | | | 463/40 |
| 2015/0227267 A1* | 8/2015 | Jarema, III | ............ | F16M 11/22 |
| | | | | 715/719 |
| 2017/0228959 A1* | 8/2017 | Bothos | ................ | B01F 15/0243 |
| 2019/0378485 A1* | 12/2019 | Arefti | ...................... | G10H 1/32 |

* cited by examiner

SELF-CONTAINED, SAFETY-CONFIRMING JUKEBOX CHASSIS AND ENCLOSURE

CROSS REFERENCE TO RELATED APPLICATIONS

This applications claims the benefit of priority from U.S. Provisional Patent Application No. 62/683,047 filed on Jun. 11, 2018, the entire content of which is hereby incorporated by reference.

TECHNICAL FIELD

Embodiments relate to digital jukeboxes including, for example, pay-for-play jukeboxes deployable at out-of-home locations.

BACKGROUND

Free standing digital jukeboxes are popular at out-of-home commercial locations including restaurants, bars, pubs, sports venues, hotels, airports and the like. The free standing digital jukeboxes, however, may not be the preferred option at some venues or locations because of their substantial footprint on floor space, size, and/or because the look-and-feel of the location may not go well with a standout free standing jukebox.

Thus, more options for providing various out-of-home locations with jukebox functionality are desired. In particular, it is desired to have more options for providing various out-of-home commercial locations with pay-for-play jukebox functionality.

BRIEF DESCRIPTION OF THE DRAWINGS

These and other features, aspects, and advantages of the instant invention will be further understood by review of the following detailed description of the exemplary embodiments when read in conjunction with the appended drawings, in which.

DETAILED DESCRIPTION

Certain exemplary embodiments provide improved jukebox design and deployment, and methods for facilitating operation thereof.

Example embodiments include a jukebox chassis that is wall mountable and which may also be lockable and/or devoid of cosmetic treatments. In some embodiments, the jukebox chassis is surrounded by an enclosure that may securely slide-on to the mounted jukebox chassis. The jukebox chassis may comprise of a rear panel and a front panel. In some embodiments the rear panel includes the processing circuitry for the jukebox, communication and storage components, and the front panel includes the display screen and payment receiving devices for the pay-for-play jukebox functionality.

When mounted on a wall, the display screen of the jukebox may be directly accessible to a user (e.g. a patron) or operator. In some embodiments, in order to cause the jukebox to play one or more selected audio and/or video items, a user inserts payment through payment slots that are exposed through the enclosure and selects the one or more songs on a touchscreen of the display screen. An operator may open the display screen and thereby access the payment collection means to, for example, collect the payments made in coins or currency notes by users. Whereas access to just the payment collection means is obtained by opening the screen, service access may require separating the rear panel and the front panel of the jukebox chassis.

The jukebox when mounted may have the display screen flush with the face of the enclosure. In order to open the jukebox's display screen, according to some embodiments, first the operator unlocks the display screen using a lock exposed through the enclosure. Then the display screen may be recessed when pushed in, and using a cantilever movement enabled by latches holding the screen, articulate upwards. The recessing and cantilever movement enable the display screen to remain flush to the face of the enclosure during operation of the jukebox, and yet allow convenient access to the operator to access the payment receive mechanism(s).

The opening of the display screen, at least in some embodiments, may also enable access to release the enclosure from its connection to the jukebox, so that the enclosure can be detached.

Figure 1:
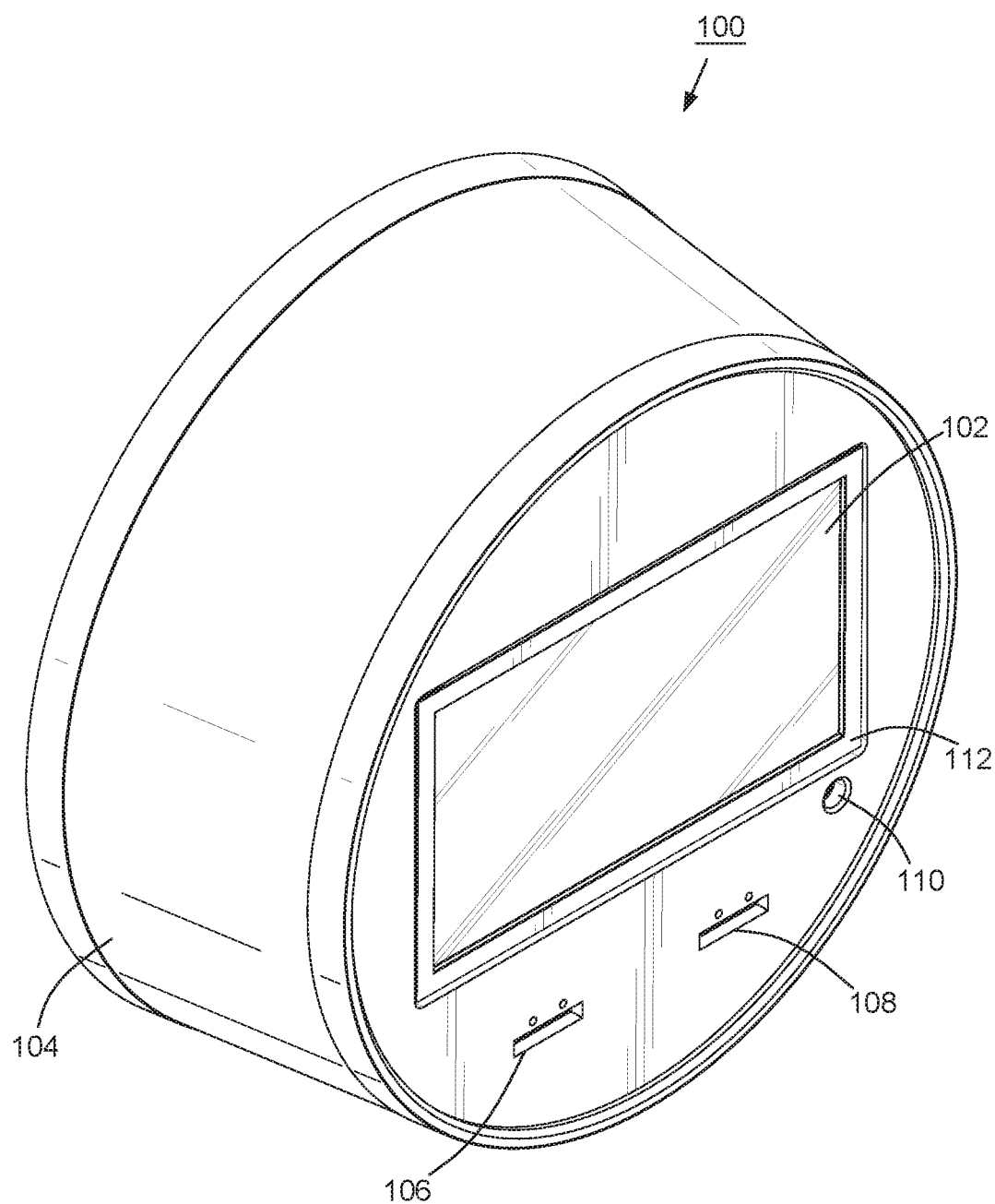
FIG. 1 is a front perspective view of a jukebox chassis and cover assembly of FIG. 1, in accordance with certain exemplary embodiments.

FIG. 1 is a front perspective view of the jukebox chassis and cover assembly, in accordance with certain exemplary embodiments. Jukebox and cover assembly apparatus ("jukebox and cover assembly") 100 is a jukebox chassis and enclosure (also referred to as "cover") being mounted on a wall or the like. The jukebox and cover assembly 100 may be designed and dimensioned to be mounted on a wall of any commercial establishment location. The positioning (e.g., height) may be in a manner that the assembly, or more specifically the payment openings, lock and/or the jukebox display screen that are visible from the outside are also conveniently accessible to a user and/or operator.

The jukebox chassis may be configured to play audio and/or video items from local storage and/or from a network location such as an external server. The playing of music and/or video on the jukebox according to embodiments may be in the same or similar manner as that described in U.S. patent application Ser. No. 13/621,922, filed on Sep. 18, 2012, the contents of which is incorporated herein in its entirety.

The display screen 102 may be configured to display one or more menu screens, information about currently playing and/or upcoming audio and/or video items, payment received information, and/or other display items. In some embodiments, the display of various display items on the display screen 102 may be in manners described in U.S. patent application Ser. No. 13/621,922.

The jukebox chassis may also have social media and other like services integrated therein. In some embodiments the integration of such services may be in accordance with, or in a similar manner to, that described in U.S. patent application Ser. No. 13/621,922.

According to embodiments, the jukebox chassis may be completely surrounded on its sides and the front by the enclosure 104, except in the jukebox display screen 102. In the illustrated embodiment, the enclosure 104 is of the shape and design of a portion of a shaped barrel (e.g., wine/beer barrel), however, embodiments are not limited thereto. The particular shape and/or design of the barrel enclosure 104 may be selected in consideration of the aesthetics and/or space requirements in the venue and/or location at which the jukebox is deployed. In various other embodiments, other shapes may be used for the enclosure 104 in a manner consistent with the teachings in this disclosure. For example, in some embodiments, another shaped enclosure may be used surrounding the jukebox on all sides and the front with openings for direct access arranged for the display screen, payment means and the lock of the jukebox. In some embodiments, the enclosure may surround the jukebox chassis on all sides and the front except for the display screen, and may or may not include openings for payment receive mechanisms and/or a lock.

As noted above, when the jukebox and cover assembly 100 is mounted on a wall or the like, the enclosure completely covers the jukebox chassis with the exception of the display 102. One or more openings may also exist in the enclosure's face for access to payment receiving mechanisms and/or locks, but such additional openings may be substantially smaller than the opening for the display screen. Therefore, the jukebox chassis itself may be devoid of any cosmetic treatments and accordingly may be more cost-effectively manufactured. Thus the jukebox assembly 100 has, among its advantages, the advantage that the jukebox chassis can be cost-effectively manufactured in a manner that various establishments can have jukeboxes deployed at their respective locations in enclosures 104 that can easily integrate with the surroundings at the venue and/or location. Moreover, the jukebox and cover assembly 100, being wall mounted and due to its streamlined design of the jukebox components requires a much smaller footprint (or correspondingly smaller wall area) than does many other types of pay-for-play jukeboxes.

The enclosure 104 serves to make it possible to deploy a jukebox chassis that has no cosmetic treatment at a commercial location with aesthetics suitable for that particular location. That is, the jukebox chassis can be deployed with many different types of enclosures.

Moreover, the enclosure 104 also allows certain portions of the jukebox chassis to be hidden from view. For example, the lock that secures the rear panel of the jukebox chassis to the front panel or chassis component of the jukebox is located on the right side of the jukebox, and is not visible to a user when the enclosure is positioned over the jukebox chassis. The hiding of the lock from view is significant as it then does not consume space in what is referred to as the "golden area" of the display screen and immediate surroundings of the display screen.

The display screen 102 of the jukebox chassis may be flush with the front face of the enclosure 104. In the embodiment illustrated in FIG. 1, in addition to the display screen 102, the only other parts of the jukebox that is exposed to viewing by the enclosure 104 are the payment receptors 106 and 108 for payment collection devices, and the lock 110.

In some embodiments, a border area 112 may surround the display screem 102. The border area 112 may itself be flush with the front face of the enclosure. In some embodiments, the border area is made of glass. In another embodiment, the border area is made of a non-glass material (e.g., plastic).

In some embodiments, the border area 112 includes LED lights surrounding the display. The LED lights may be configured to display in patterns and/or color variations that are responsive to selected characteristics of the music being currently played on the jukebox. For example, one or more processors of the jukebox may detect audio characteristics of sound captured from a microphone, and accordingly control a display pattern and/or display colors of the LED lights.

Restricting how much of the jukebox is exposed enhances the aesthetic appearance of the assembly and also enhances security and safety of the jukebox and payment collectors housing payments that have been received from patrons. For example, some embodiments may have no mechanical switch or the like that is exposed to view, which a patron can control to affect operation of the jukebox.

Payment receive slots 106 and 108 may be dimensioned to receive the same or different payment means. One may be dimensioned and arranged to receive coins and paper currency notes, while the other may be another payment means such as credit/debit cards etc. In another embodiment, one collector slot 106 may be configured for coins, and collector slot 108 is configured to receive paper currency notes. In some embodiments, one or more of the payment slots may have surrounding or nearby-positioned LED lights, such that, even in a dark a dark environment, patrons can conveniently locate the payment receiver slots. Although two payment slots are shown in the assembly 100, embodiments may have any number of payment acceptance devices, and they may be arranged to be exposed to the user at various locations on the front face of the enclosure 104.

In some embodiments, the lock 110 enables an operator and/or an authorized person at the deployed location to secure the enclosure 104 to the jukebox chassis (of which the screen 102 is visible) so that it is made more difficult or impossible for someone to unintentionally or without authorization separate the enclosure from the jukebox chassis, and/or to access the internals of the jukebox chassis. In some other embodiments, the enclosure 104 is attached to the jukebox chassis fixedly, such as, for example, with screws on the jukebox chassis and/or the inside portions of the enclosure. In yet another embodiment, the jukebox chassis is tightly, but detachably, attached to the enclosure. In some embodiments, the border 104 is sized and arranged in a material including a flexible material such that a tight fitting of the jukebox chassis to the enclosure can be facilitated.

The display screen 102 may be a touchscreen. In various embodiments, the display screen 102 may show audio and/or video selection options, information about audio and/or video that is currently being played on the jukebox, and payment information for pay-for-play items. When a user-selected audio item is being played by the jukebox over speakers built in to the assembly 100 or over other speakers, the display screen may display related images.

The jukebox display screen 102 is configured to be opened providing access to at least a portion of the inside of the jukebox chassis. In some embodiments, the screen articulates upwards when being opened. The portion of the inside of the jukebox chassis exposed when the screen 102 is opened may include one or more payment collectors. Thus, by opening the display screen 102, an operator or other authorized user can access the payment collectors to periodically empty the payment collection bins of payments made by users. The capability to access the payment collections by opening just the screen portion offers a convenient way of accessing a relatively frequently accessed internal part of the jukebox chassis via the display screen. Also, enabling access to the payment collection means via the display screen, enables the jukebox to be enclosed in various different types of enclosures because as long as the enclosure provides direct access to the display screen, payment slots (if any), and screen lock (if any), the jukebox chassis may be enclosed in many different types of enclosures.

For smooth opening of the display screen 102, the display screen 102 and the latches coupled to the display screen are arranged such that when being opened, the display screen 102 recesses just slightly into the enclosure and then cantilevers up ending, at least in some embodiments, with a ninety degree (or substantially near ninety degree) angle with the front face of the enclosure.

The recess and cantilever arrangement in the latches of the screen enables the screen to be flush with the face of the enclosure and yet allow for convenient opening.

The lock 110 is configured and positioned so that in normal use the display screen 102 is locked to the rest of the jukebox chassis. An operator or user can quickly unlock the lock 110 with a key and thereby be able to open the display screen 102. The payment collection bins are thus secured from unauthorized access, while yet allowing quick and convenient access for accumulated payment retrieval. Thus, FIG. 1 provides a self-contained, safety-confirming jukebox apparatus according to some embodiments.

Figure 2:
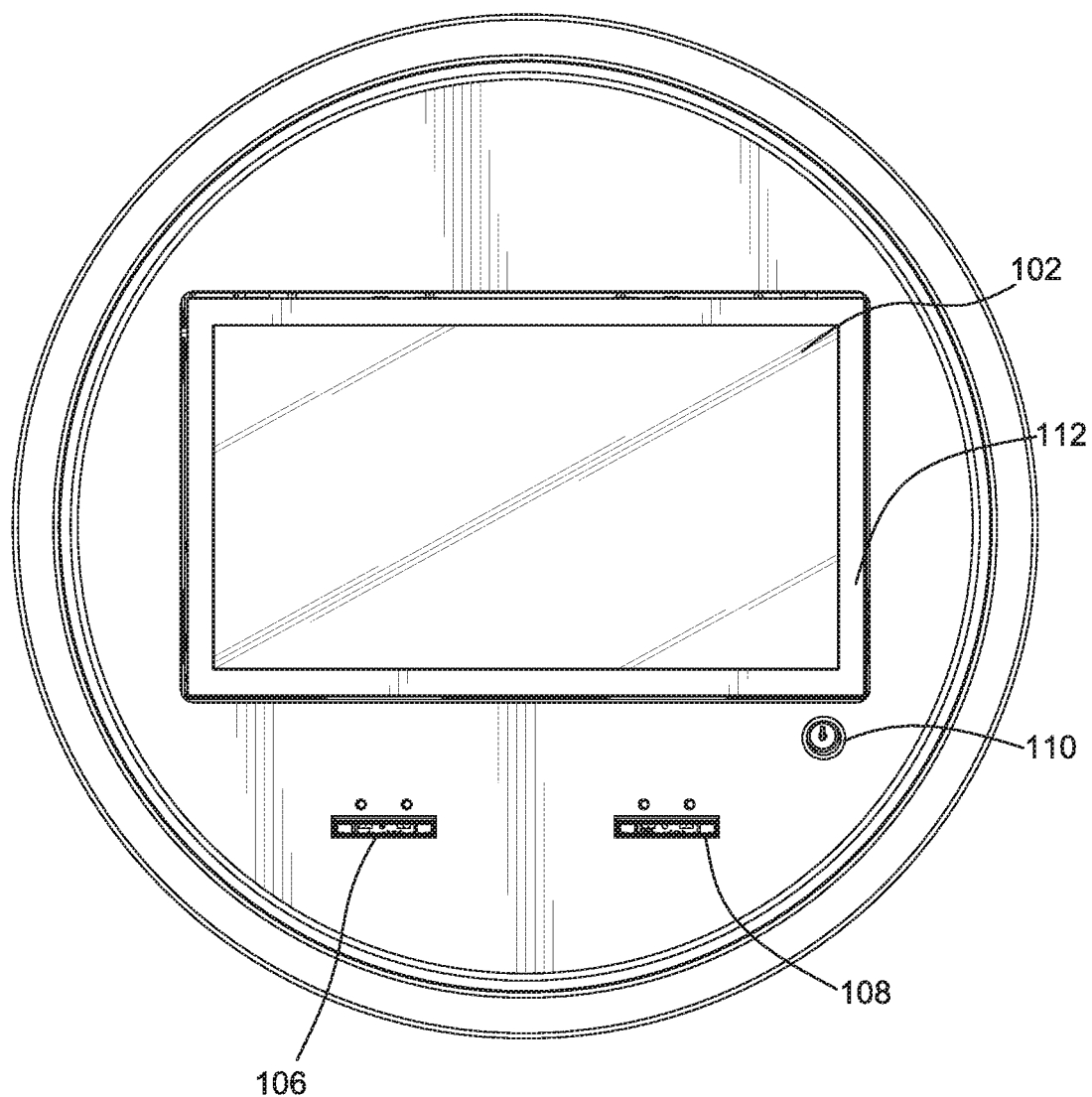
FIG. 2 is a front plan view of the jukebox chassis and cover assembly of FIG. 1, in accordance with certain exemplary embodiments.

FIG. 2 is a front plan view of the jukebox chassis and cover assembly 100 shown in FIG. 1.

Figure 3:
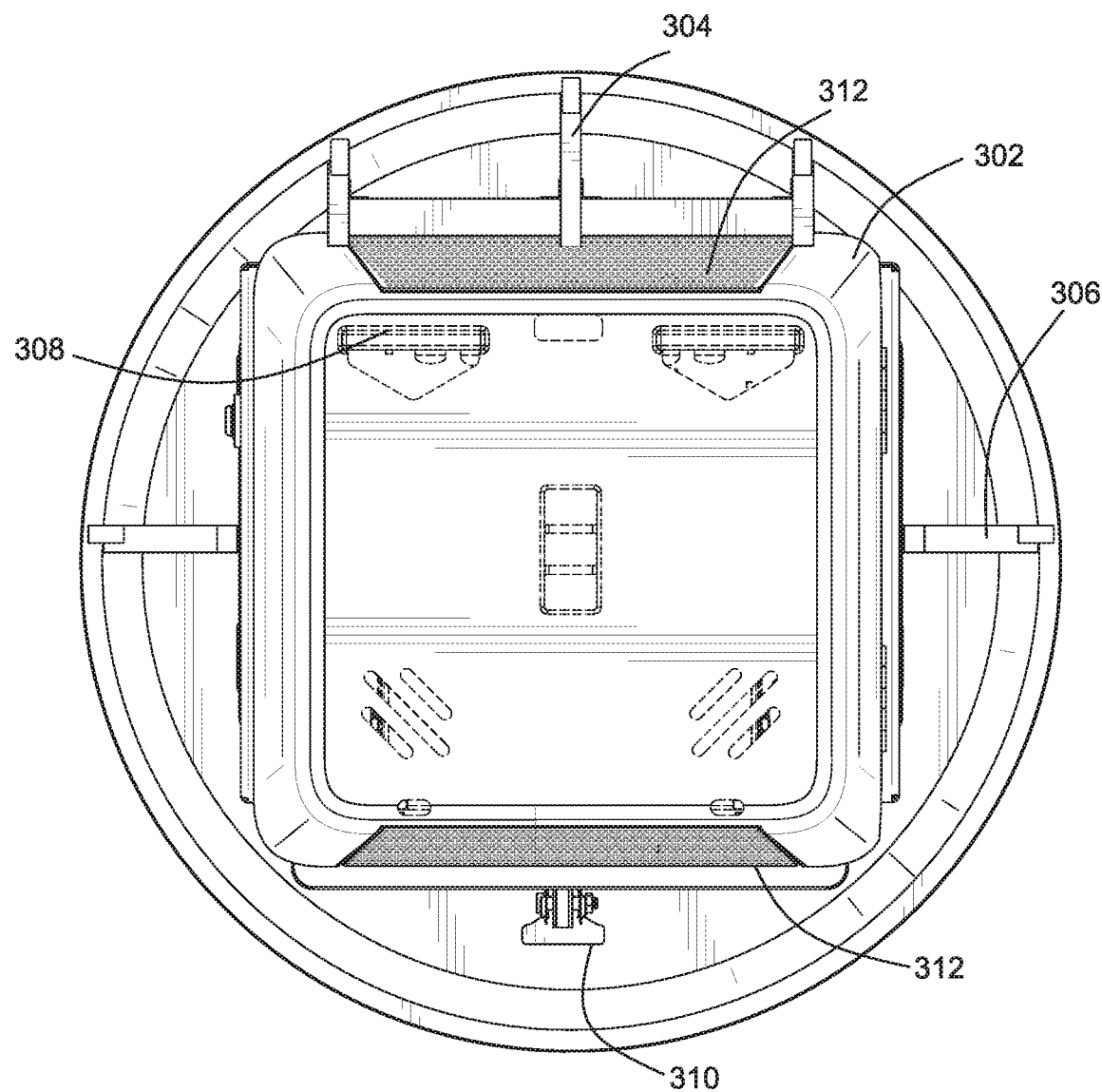
FIG. 3 is a rear plan view of the jukebox chassis and cover assembly of FIG. 1, in accordance with certain exemplary embodiments.

FIG. 3 is a rear plan view of the jukebox chassis and cover assembly 100 shown in FIG. 1.

As illustrated, in some embodiments, the jukebox chassis is positioned and/or held within the enclosure 104 by several positioning and/or holding support bars 304 and 306. The positioning and/or holding bars may be made of the same material as the outer surface of the enclosure. The positioning and/or holding bars may be dimensioned and/or may be made adjustable so that they fit tightly on to the jukebox chassis. In some embodiments, the support bars may be formed on a rim of flexible materials in order to facilitate a tight/snug fitting of the bars to the sides of the jukebox chassis. In some embodiments, the holding/support bars may be arranged and affixed to the inside of the enclosure in a manner that allows for smoothly sliding over the enclosure onto the jukebox chassis. As shown in FIG. 3, at least some embodiments, the positioning and/or holding bars may also make contact with the jukebox chassis rear panel 302 which is configured to be mounted to a wall. Also as shown in FIG. 3, the rear panel 302 may include mounting equipment 308 to mount the apparatus to the wall. The rear panel 302 may also include ventilation openings 312. FIG. 3 also shows a latch 310 that is affixed to the enclosure in a position at which it can latch with a latch component that is on the front of the jukebox chassis. The latches on the enclosure and the jukebox chassis may attach with each other to secure the enclosure to the jukebox chassis.

Figure 4:
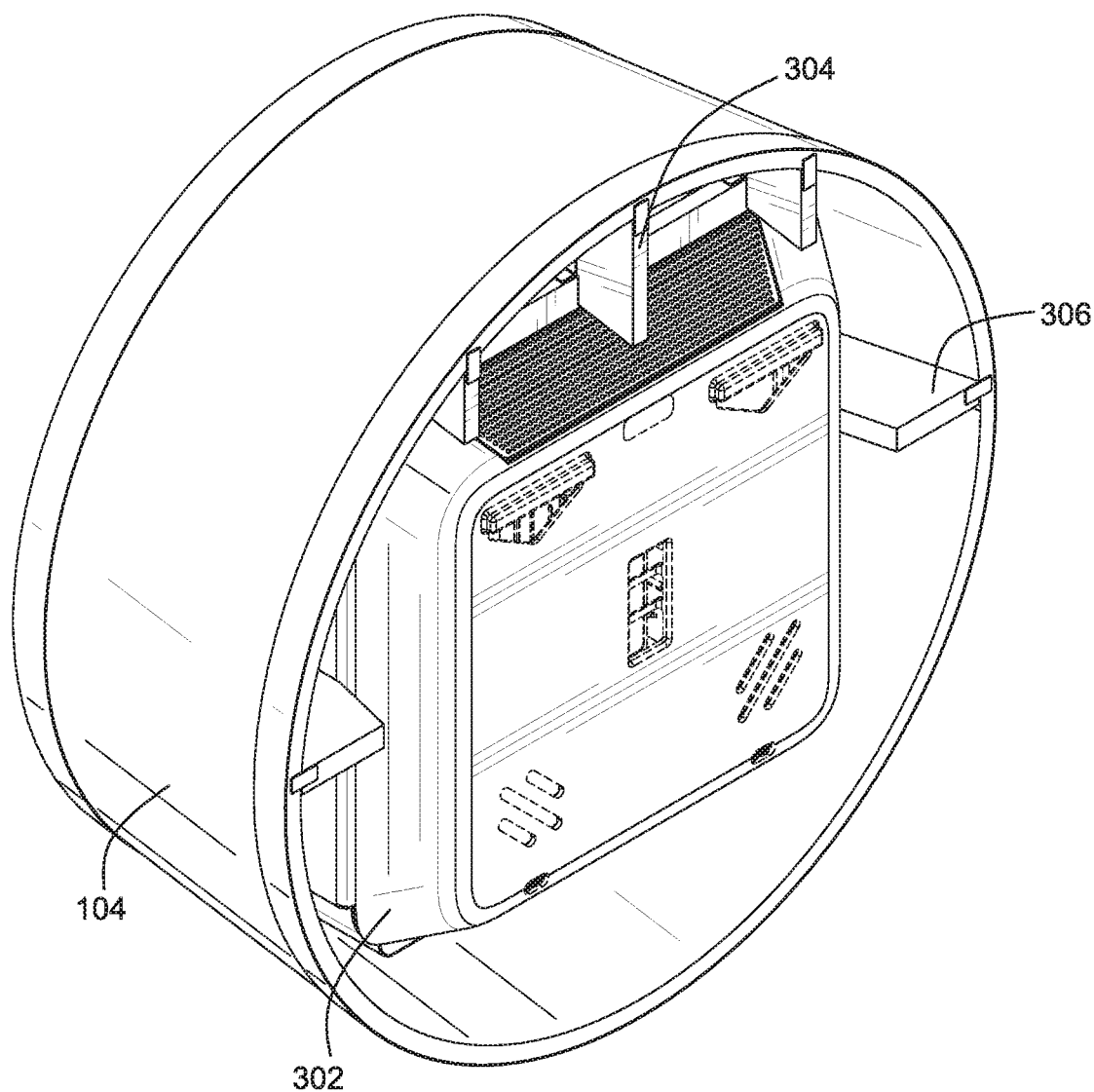
FIG. 4 is a rear perspective view of the jukebox chassis and cover assembly of FIG. 1, in accordance with certain exemplary embodiments.

FIG. 4 is a rear perspective view of the jukebox chassis and cover assembly described in relation to FIG. 3.

Figure 5:
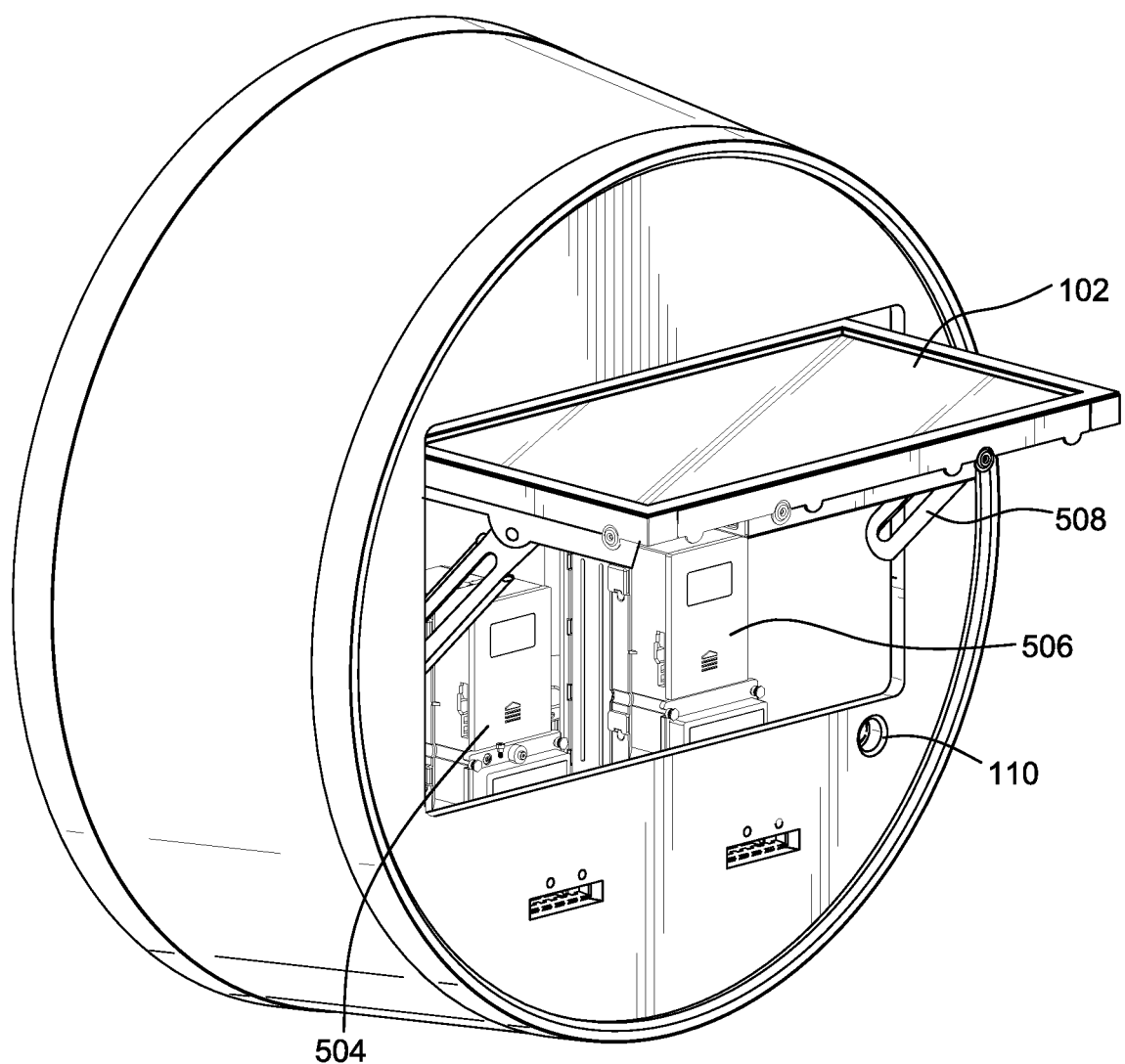
FIG. 5 is a front perspective view of the jukebox chassis and cover assembly of FIG. 1 while the jukebox screen is open, in accordance with certain exemplary embodiments.

FIG. 5 is a front perspective view of the jukebox chassis and cover assembly while the jukebox display screen 302 is open, in accordance with certain exemplary embodiments. The figure shows the screen 102 in the open position, and the exposed payment collection devices 504 and 506. Each of the payment collection devices may be additionally locked themselves. Thus for example, in some embodiments, the operator may be required to use a second key (i.e. in addition to the key to unlock lock 110) and/or security code to access each of the payment collection devices 504 and 506.

As described above, opening the display screen 102 may be based on the operator unlocking a lock 110. One or more hinges and latches, such as 508, may operate recess the display screen 102 slightly into the enclosure so that it could be opened upward to a substantially ninety-degree angle as shown in FIG. 5. As shown, the display screen 102 is opened in the upward direction, thereby minimizing any interference with the operator's access to the payment collection devices.

Figure 6:
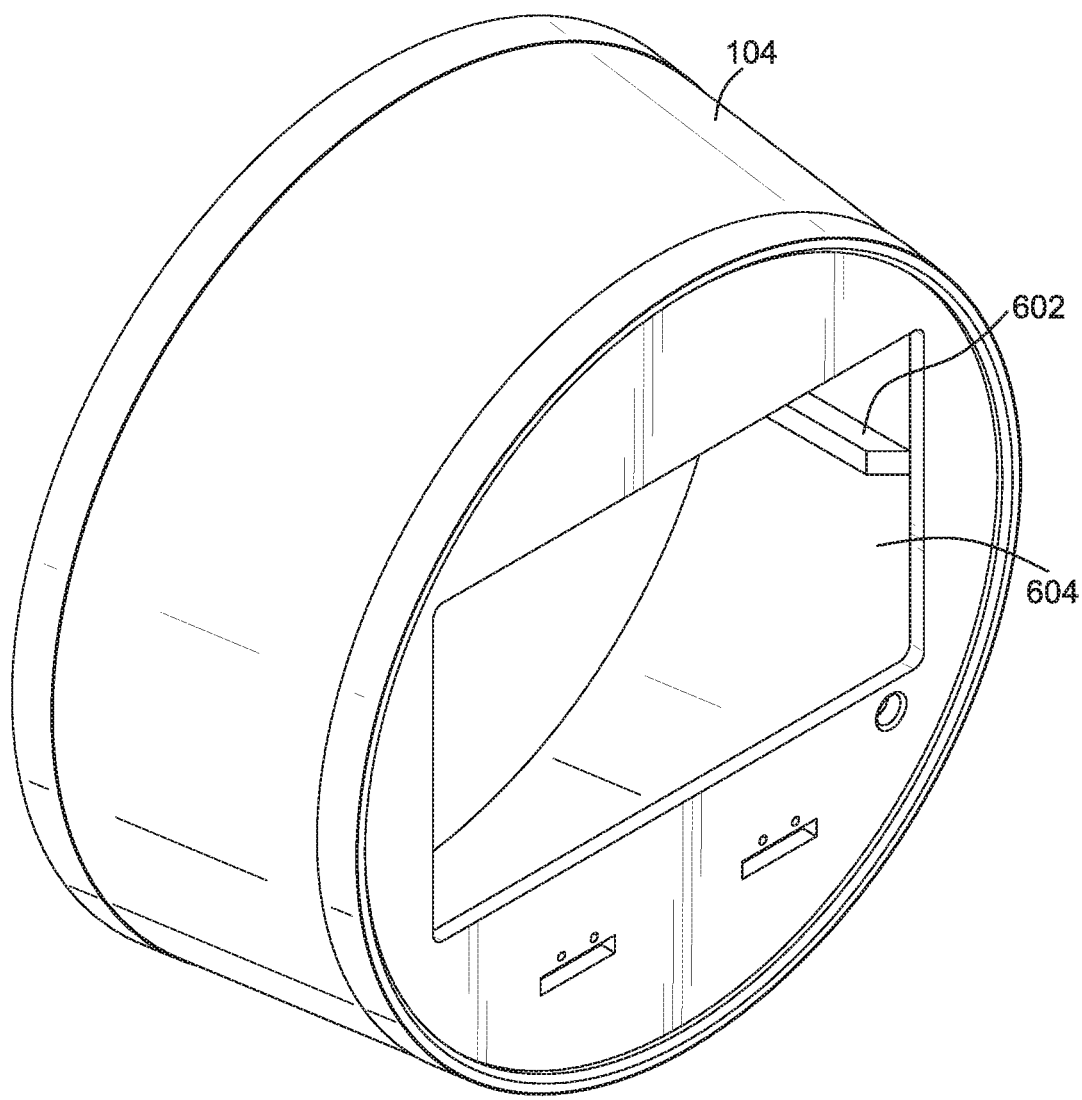
FIG. 6 is a front perspective view of the enclosure of the assembly, in accordance with certain exemplary embodiments.
Figure 7:
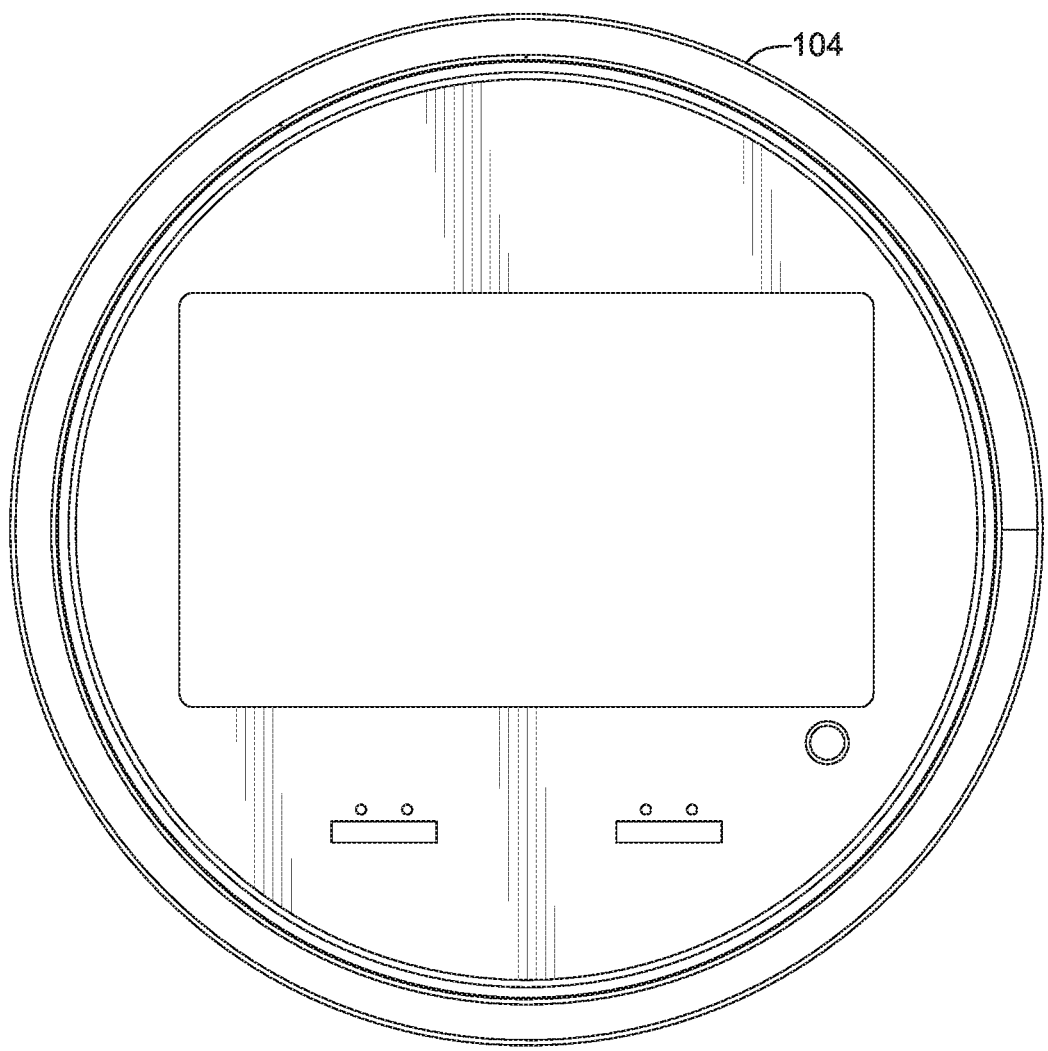
FIG. 7 is a front plan view of the enclosure, in accordance with certain exemplary embodiments.

FIG. 6 is a front perspective view of the enclosure 104, in accordance with certain exemplary embodiments. The jukebox chassis is not included in the front perspective view shown in FIG. 6, and therefore, some of the internal railings 602 and the like included on the internal surface of the enclosure 104 can be seen through the opening 604 intended for the display screen of the jukebox chassis. FIG. 7 is a front plan view of the enclosure 104 shown in FIG. 6, also shown without the jukebox chassis being inserted in the enclosure.

Figure 8:
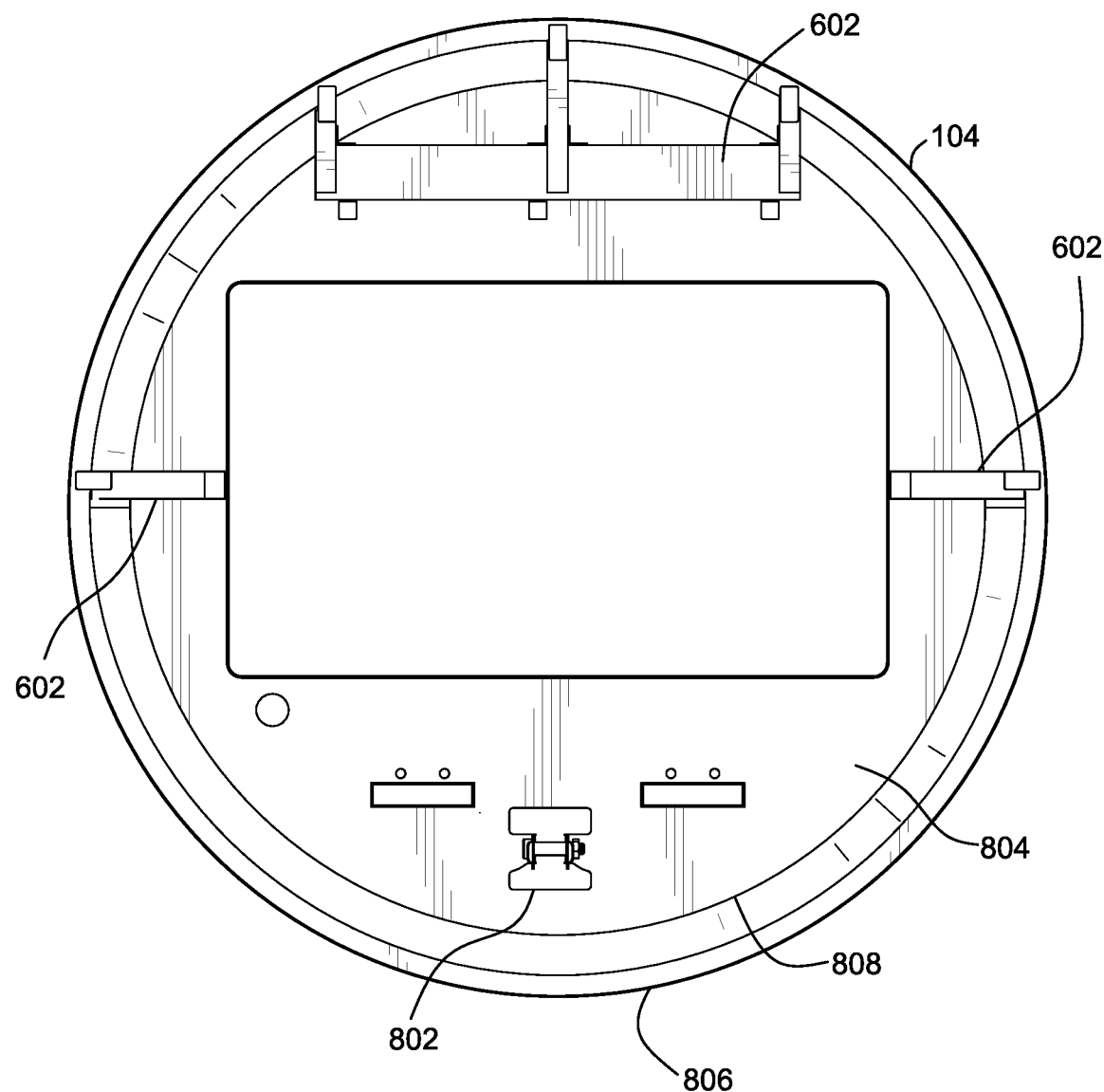
FIG. 8 is a rear plan view of the enclosure, in accordance with certain exemplary embodiments.

FIG. 8 is a rear plan view of the enclosure 104 shown in FIGS. 6 and 7. The position of the latch 802 is clearly shown. As described above, latch 802 which is located on the internal surface 804 of the enclosure and is thus hidden from user view can be used to position and/or secure the jukebox chassis to the enclosure. FIG. 8 also shows one or more railings 602 that are arranged to hold, secure and/or guide the jukebox chassis when it is inserted into the enclosure. In the particular embodiment shown in FIG. 8, the rear opening of the enclosure is larger than the front face surface area. As shown, for example, the circumference 806 or the rear end of the enclosure is larger than the circumference 808 of the front face of the enclosure.

Figure 9:
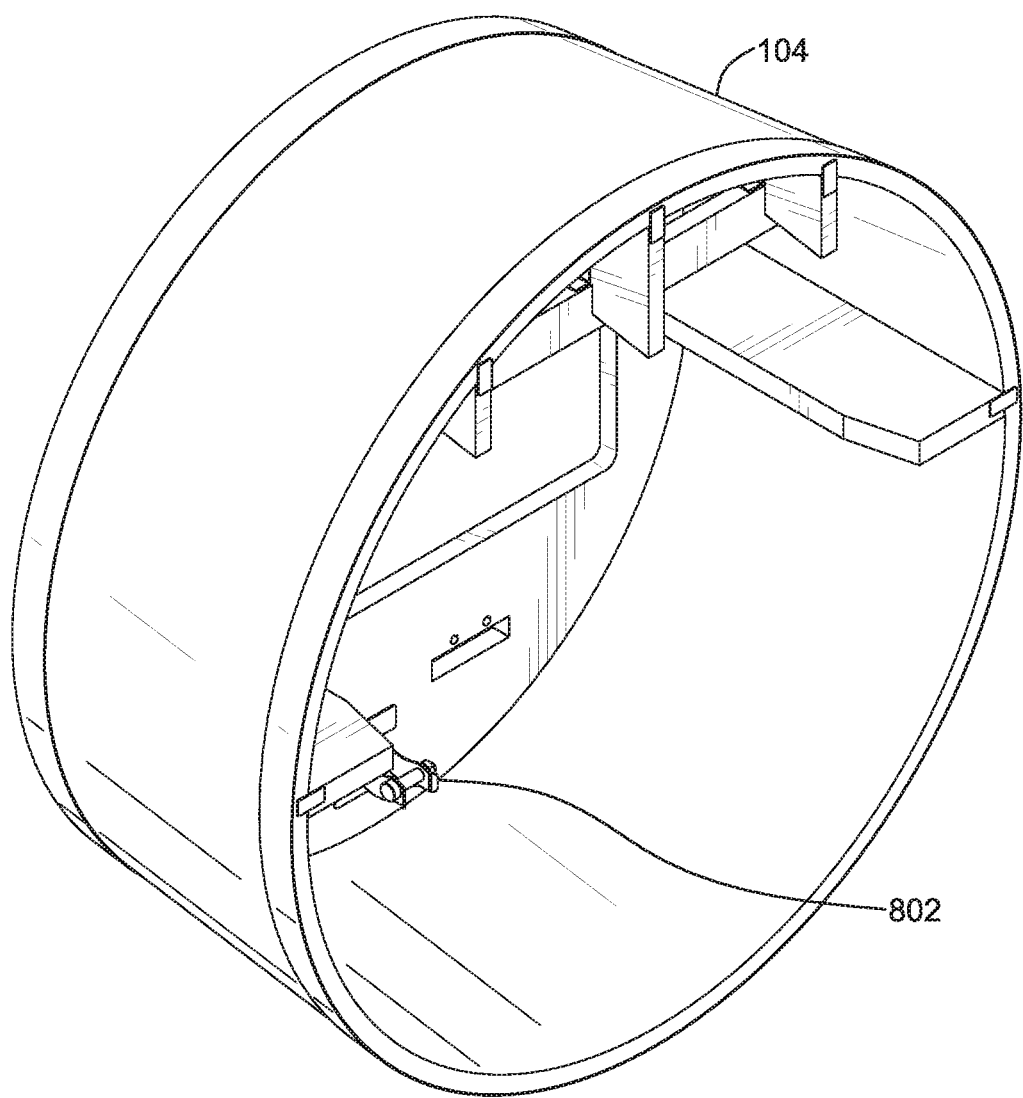
FIG. 9 is a rear perspective view of the enclosure, in accordance with certain exemplary embodiments.

However, embodiments are not limited to such differences between the rear and front ends of the enclosure. For example, some embodiments may include the same sized front and rear ends of the enclosure, and some other embodiments may include a larger front end than the rear end. Moreover, in some embodiments, the front and rear ends of the enclosure may be differently shaped. For example, in some embodiments, the front face of the enclosure may be rounds whereas the rear end which mounts to the wall may be square or rectangular-shaped. FIG. 9 is a rear perspective view of the enclosure shown in FIG. 8.

Figure 10:
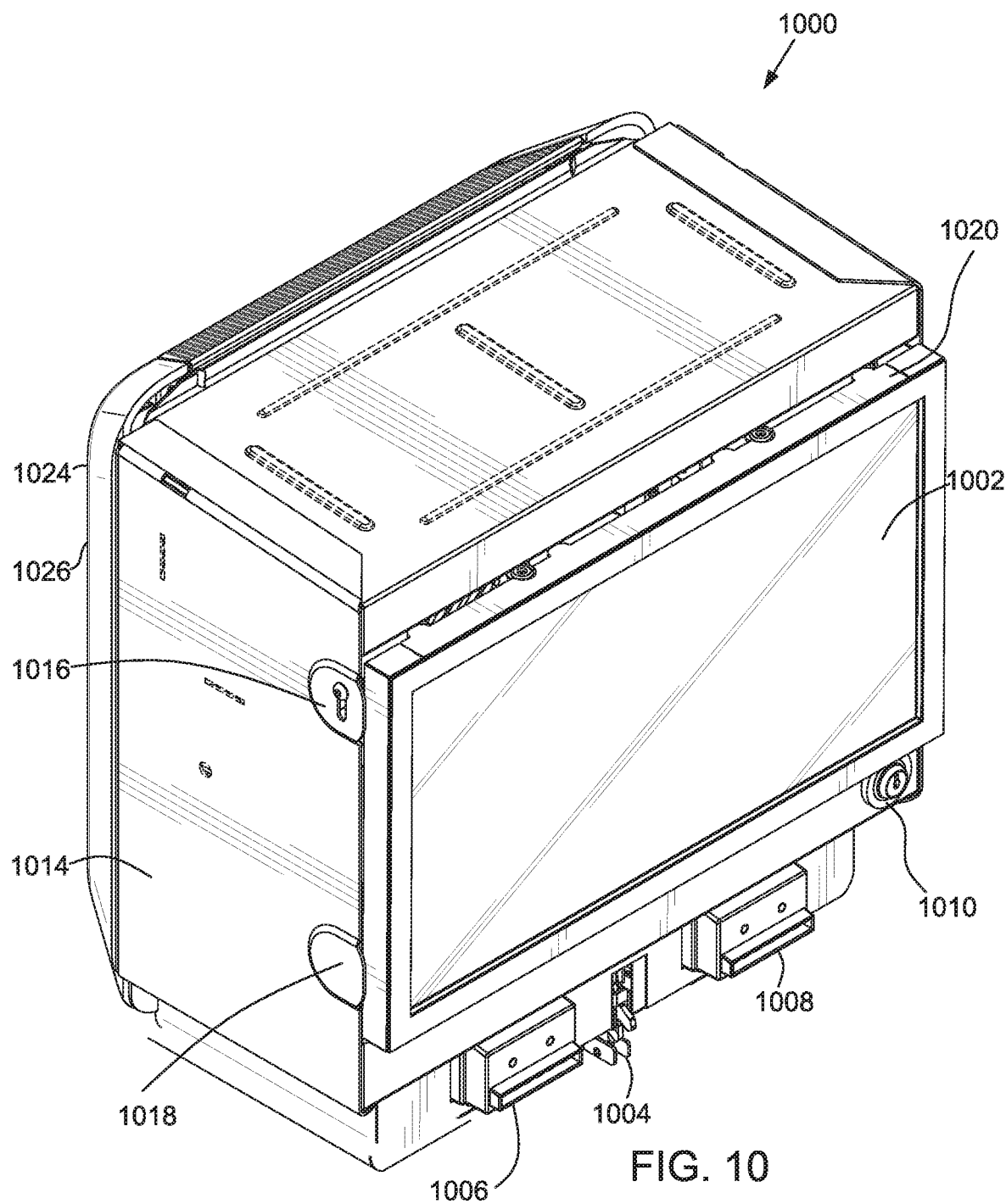
FIG. 10 is a front perspective view of the jukebox chassis, in accordance with certain exemplary embodiments.

FIG. 10 is a front perspective view of the jukebox chassis 1000, in accordance with certain exemplary embodiments. The jukebox chassis 1000 may be the jukebox chassis that is included in the assembly 100 shown in FIG. 1. The jukebox chassis 1000 includes a rear panel 1024 (e.g. similar to rear panel 302 shown in FIG. 3) that is designed to be mounted to the wall, and a structure 1014 as the front panel of the chassis 1000. The display screen 1002 is rotatably-affixed to the structure 1014 such that the display screen 1002 can be opened upwards, rotating upwards from the connecting hinge 1016. Connecting hinge 1016 may be designed with a vertical channel such that, when the display screen 1002 is being opened, the display screen 1002 can be moved rotatably while a bolt/screw holding the display screen 1002 stays fixed in place. Another tab 1018 may be positioned towards the bottom on the sides of the display screen 1002 such that the screen stays in place when in closed position. Tab 1018 may be dimensioned so that the display screen 1002 is held tight to the structure 1014.

The payment slots of the payment acceptor devices 1006 and 1008 are positioned below the display screen 1002. Such positioning is intended to make it easier for the user to insert payment while watching the music choices etc. that are displayed on the display screen.

Latch 1004 which is in the front of the jukebox chassis 1000 is designed to latch or lock against a matching component such as, for example, latch 802 of the enclosure. Thus latches 1004 and 802 may securely attach the enclosure to the jukebox chassis.

The lock 1010 is positioned just below the screen, to the right and above the payment slots. The positioning of the lock 1010, again, is intended to make the opening of the display screen easier and more convenient. As noted above, the lock 1010 operates to lock the display screen 1002 to the rest of the chassis and/or to the enclosure.

In some embodiments, the display screen is bumped-out 1020 from the jukebox chassis's front panel. This facilitates arranging the enclosure 104 and jukebox chassis such that the face of the enclosure is flush with the display screen 102 of the jukebox.

Figure 11:
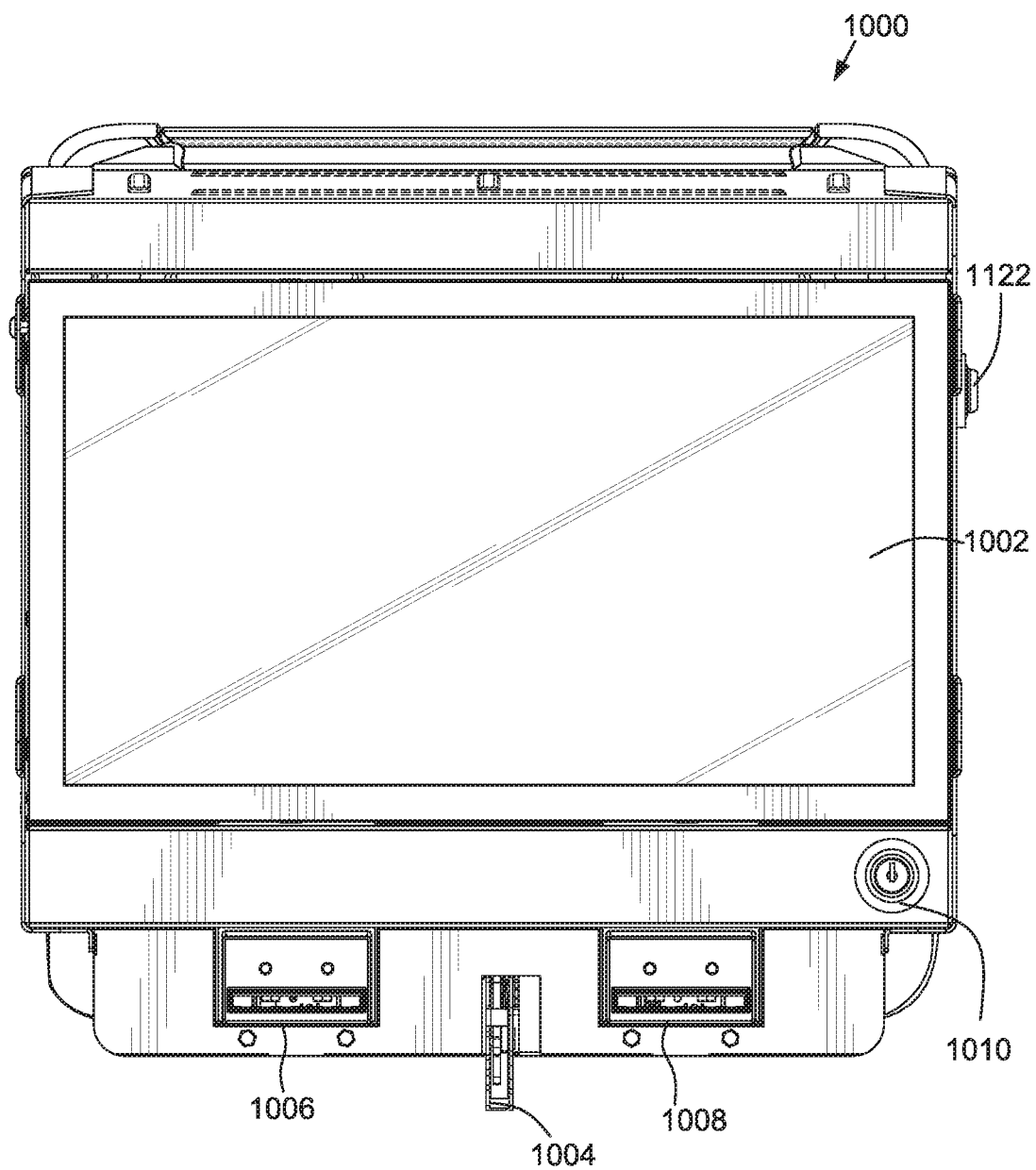
FIG. 11 is a front plan view of the jukebox chassis, in accordance with certain exemplary embodiments.

FIG. 11 is a front plan view of the jukebox chassis 1000 shown in FIG. 10. A side-located lock 1122 is visible in the front plan view. The side-located lock 1122 may be located on the structure of the front panel of the jukebox chassis and may be configured to securely lock the front panel to the rear panel of the jukebox chassis so that access to all internal components of the jukebox chassis, except access to payment receive devices for retrieving the collected funds, is prevented when the lock is engaged and is facilitated when the lock is disengaged to allow opening of the front panel.

Figure 12:
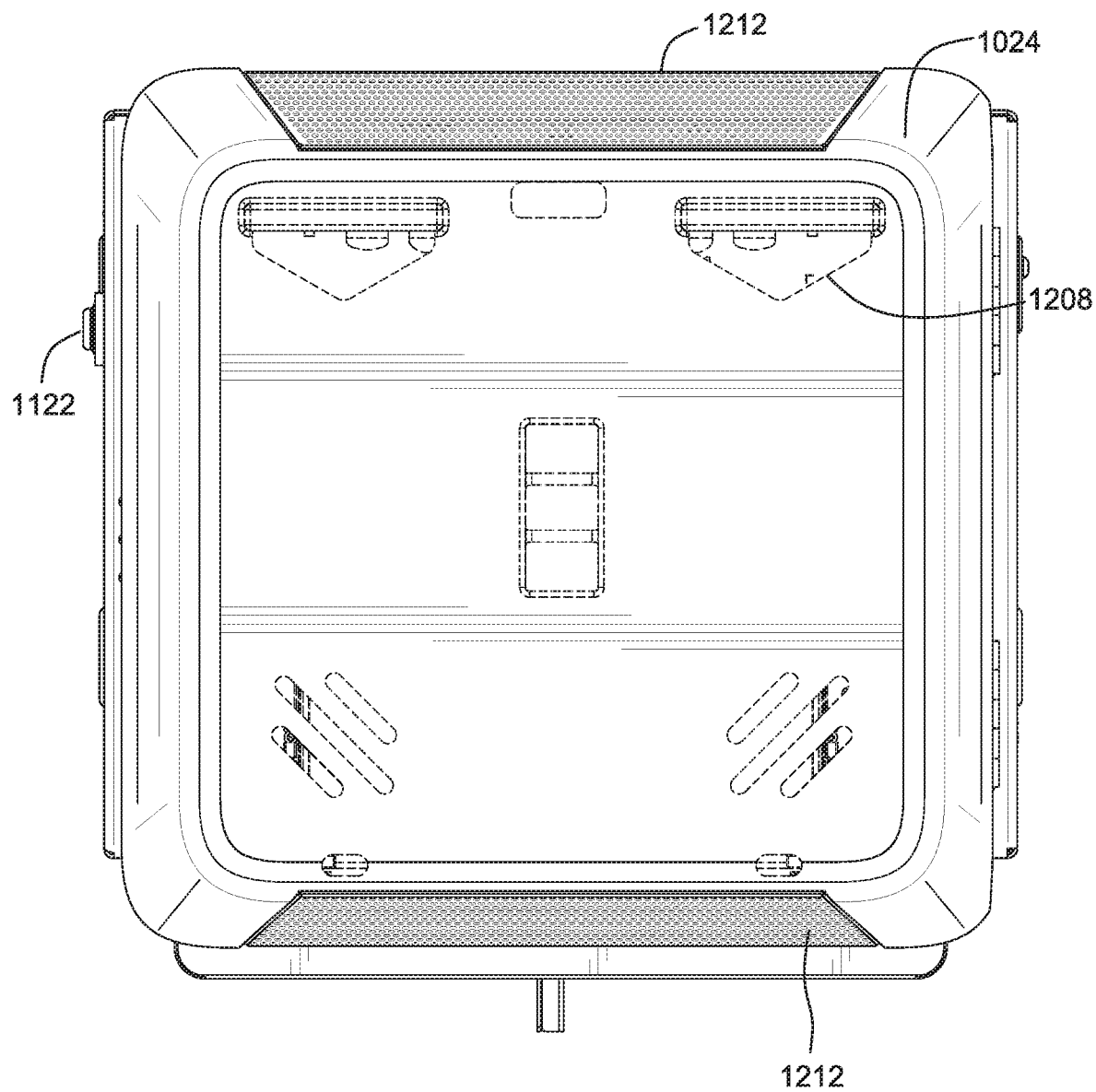
FIG. 12 is a rear plan view of the jukebox chassis, in accordance with certain exemplary embodiments.

FIG. 12 is a rear plan view of the jukebox chassis 1000 shown in FIG. 10. The rear plan view shows the mounts 1208 to be used when mounting to the wall, and cooling vents 1212. The side-located lock 1122 may also be visible in this view.

Figure 13:
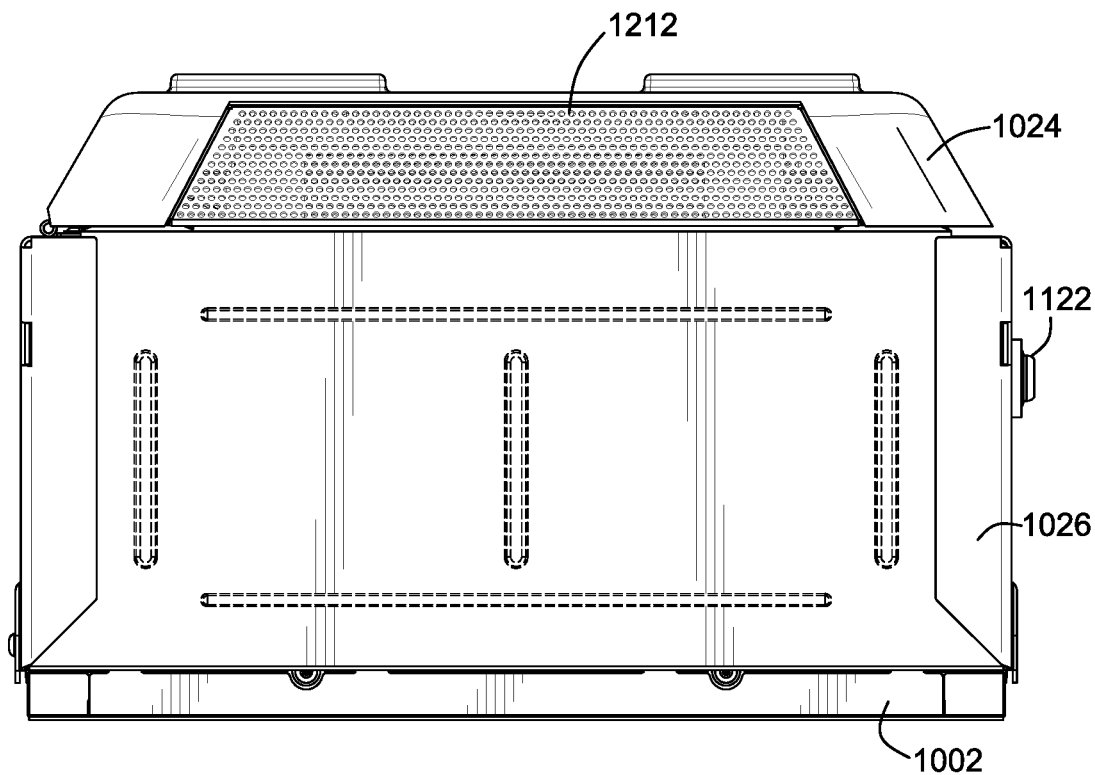
FIG. 13 is a top view of the jukebox chassis, in accordance with certain exemplary embodiments.
Figure 14:
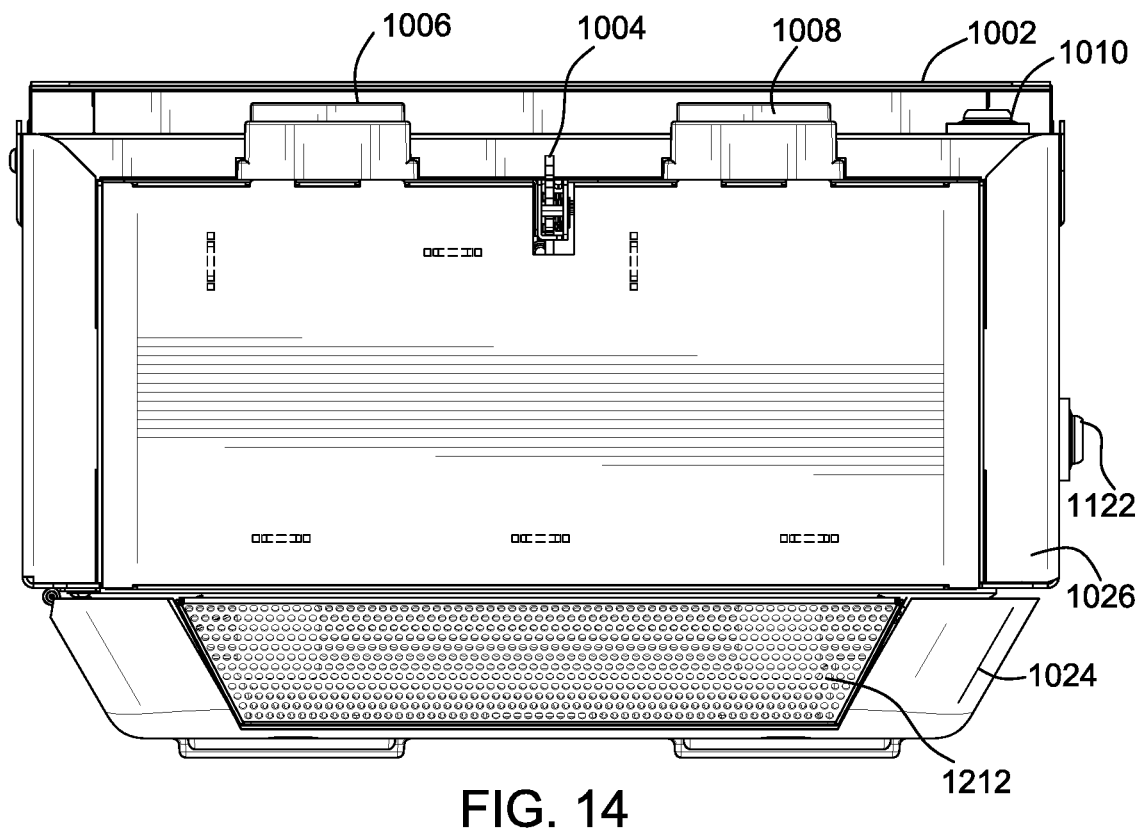
FIG. 14 is a bottom view of the jukebox chassis, in accordance with certain exemplary embodiments.
Figure 15:
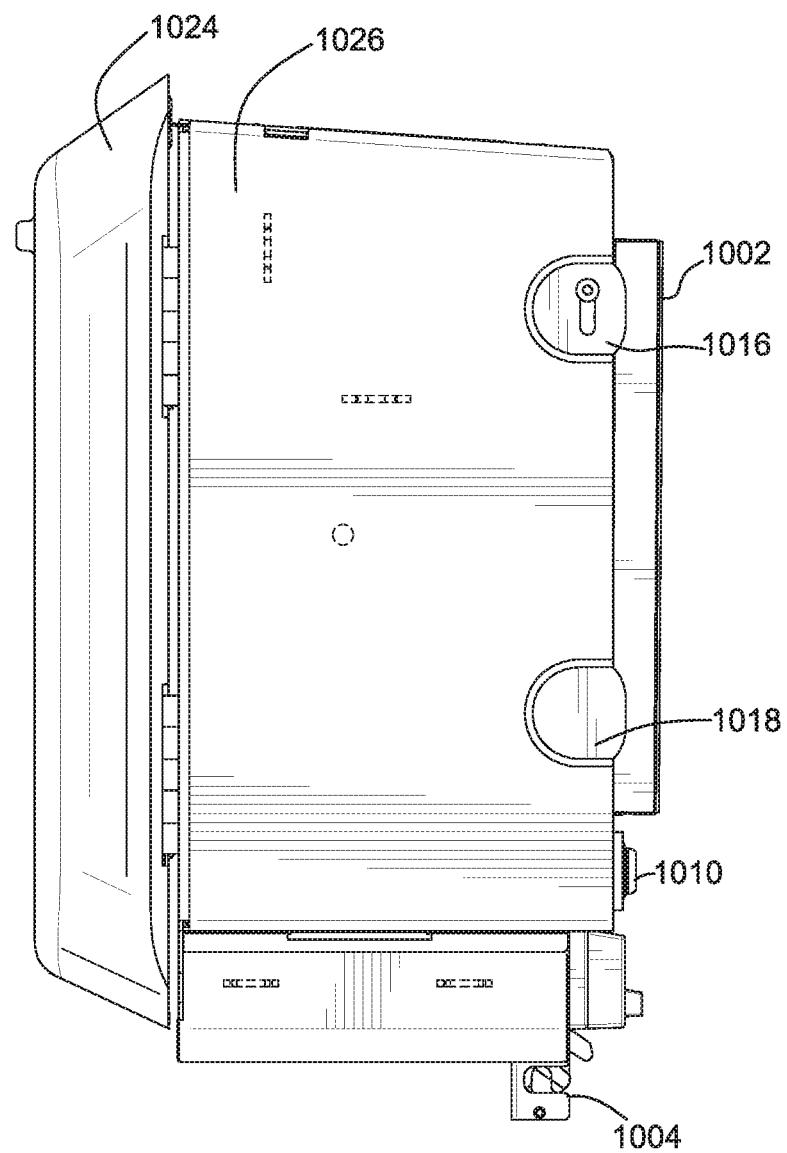
FIG. 15 is a left view of the jukebox chassis, in accordance with certain exemplary embodiments.
Figure 16:
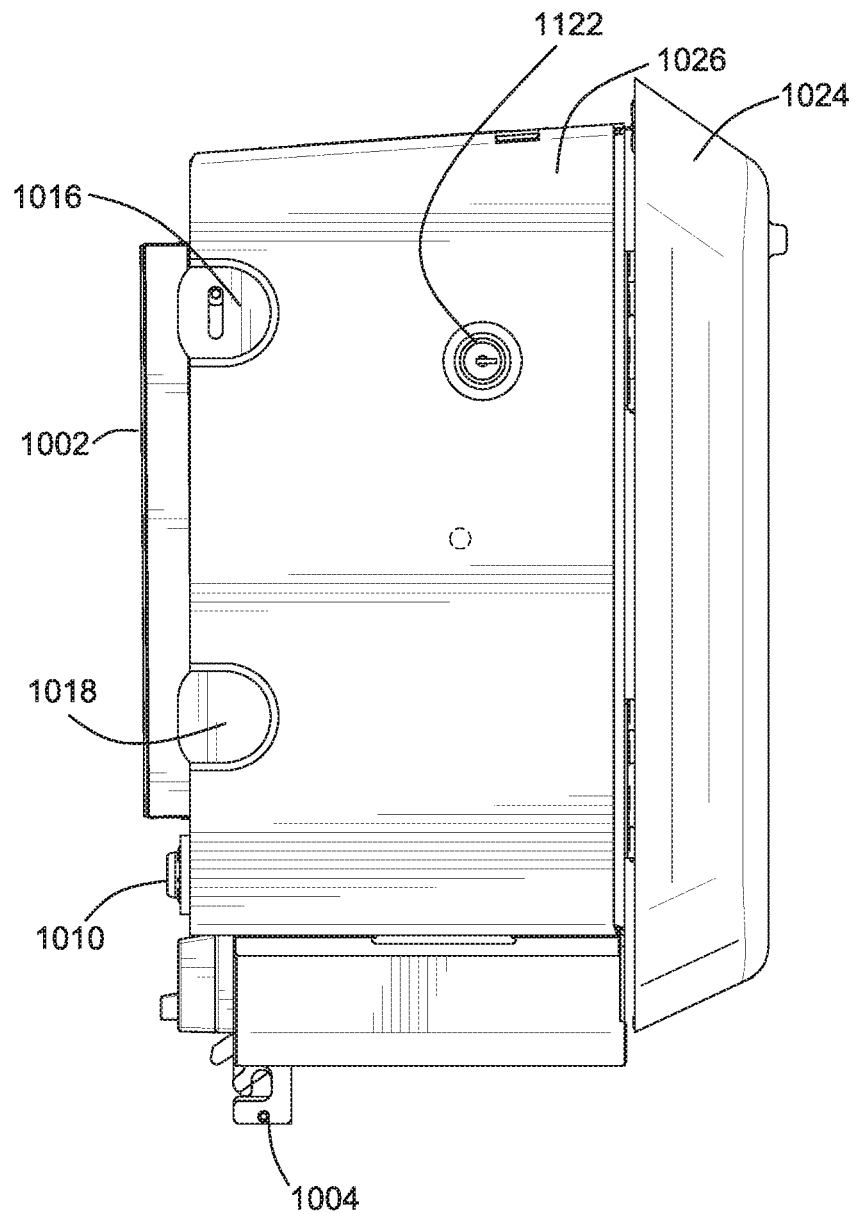
FIG. 16 is a right view of the jukebox chassis, in accordance with certain exemplary embodiments.

FIGS. 13 and 14 are a top view and a bottom view of the jukebox chassis 1000. In FIG. 13 top view, the lock 1010 arranged on the front of the jukebox chassis may not be visible because the display screen 1002 juts out from the structure that is the front panel of the jukebox chassis. In the bottom view shown in FIG. 14, the lock 1010 on the front of the chassis and also the side-located lock 1122 can be seen. The bottom view also clearly shows the latch 1004 that is located on the front panel portion of the jukebox chassis, and is configured to secure the chassis to the enclosure. In the illustrated embodiment, the bottom view also shows the bottoms of the payment collection devices 1006 and 1008. Access to these, however, is prevented by the display screen 1002 when the display screen is secured to the jukebox chassis by the lock 1010, FIGS. 15 and 16 are a left view and a right view of the jukebox chassis 1000 respectively.

Figure 17:
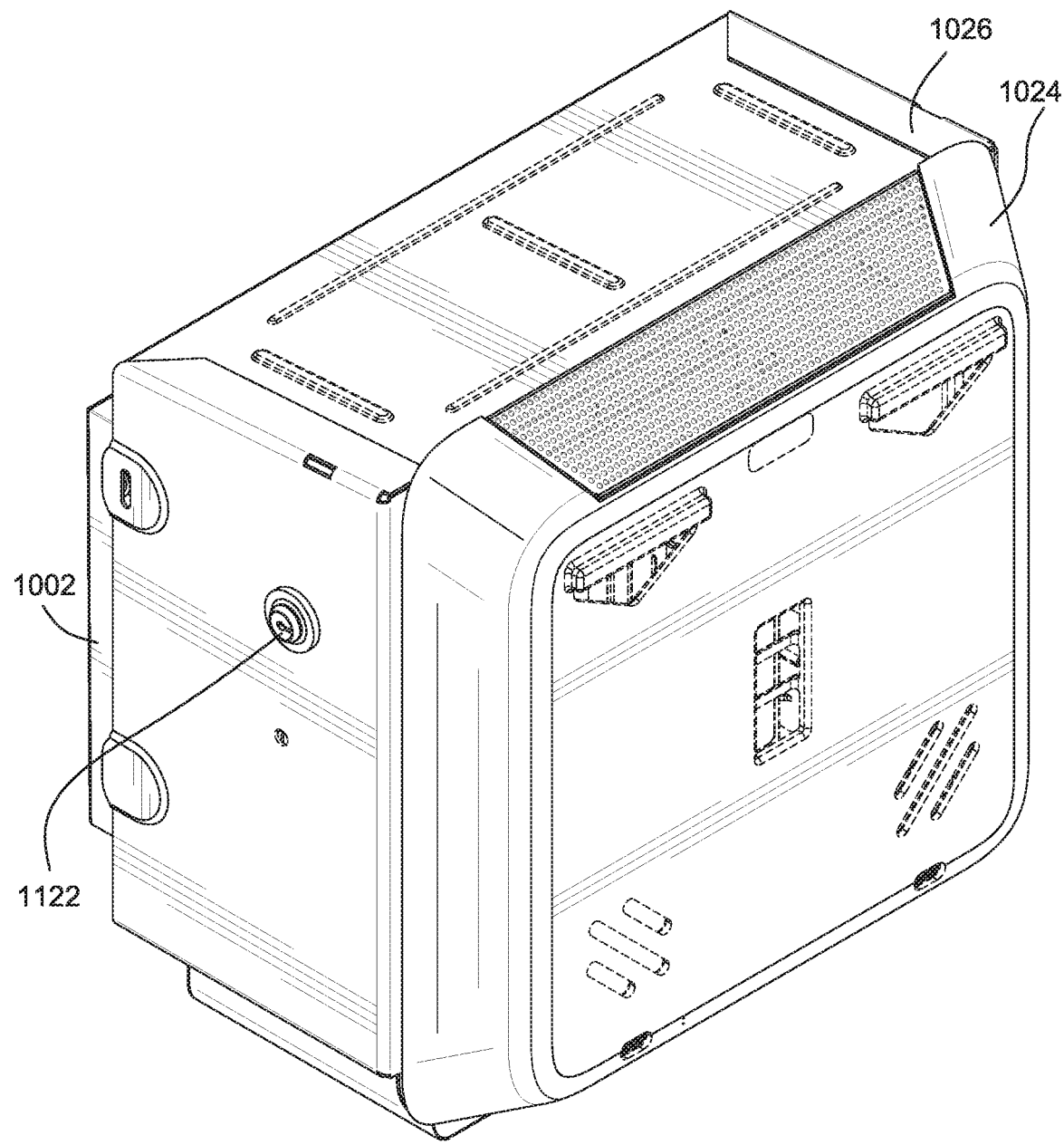
FIG. 17 a rear perspective view of the jukebox chassis in accordance with certain exemplary embodiments.

These figures show the upper rotatable latch 1016 that couples the display screen 1002 to the chassis being configured such that there can be some movement in the latch when the display screen is opened. The figures also show the tab 1018 which tightly holds the display screen, when closed, to the chassis, the front-located lock 1010 and the latch 1004. The right view also shows the side-located lock 1122. The lock 1122 is operable to lock the chassis front panel 1026 to the rear panel 1024. The lock 1122 is positioned nearer to the rear panel than to the display screen 1002. This positioning of the lock facilitates locking the chassis to the rear panel. FIG. 17 a rear perspective view of the jukebox chassis in accordance with certain exemplary embodiments.

Figure 18A:
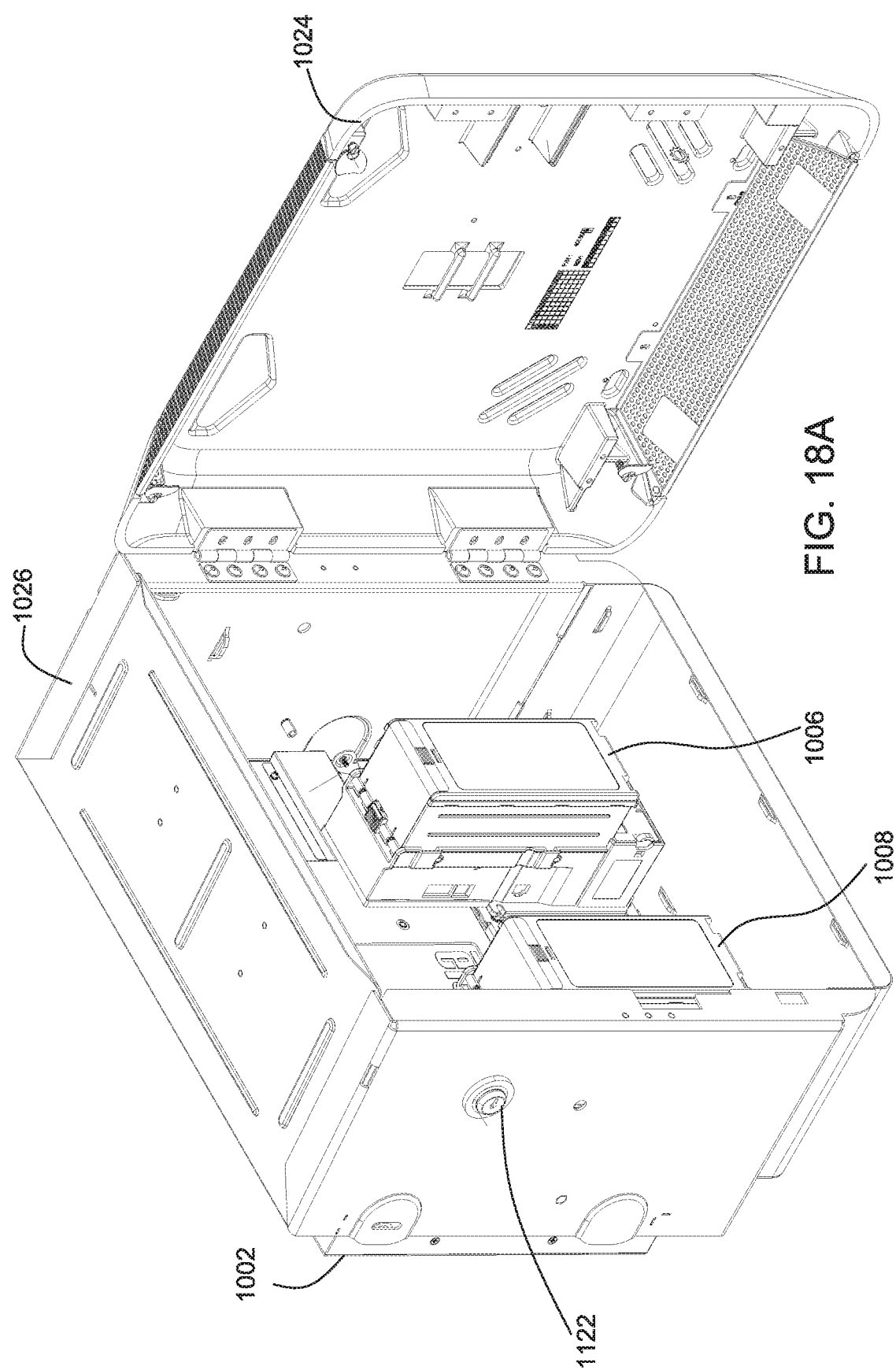
FIG. 18 (FIG. 18A and FIG. 18B) is a view of the jukebox chassis with the lock 1122 unlocked and the front panel opened, according to some embodiments.
Figure 18B:
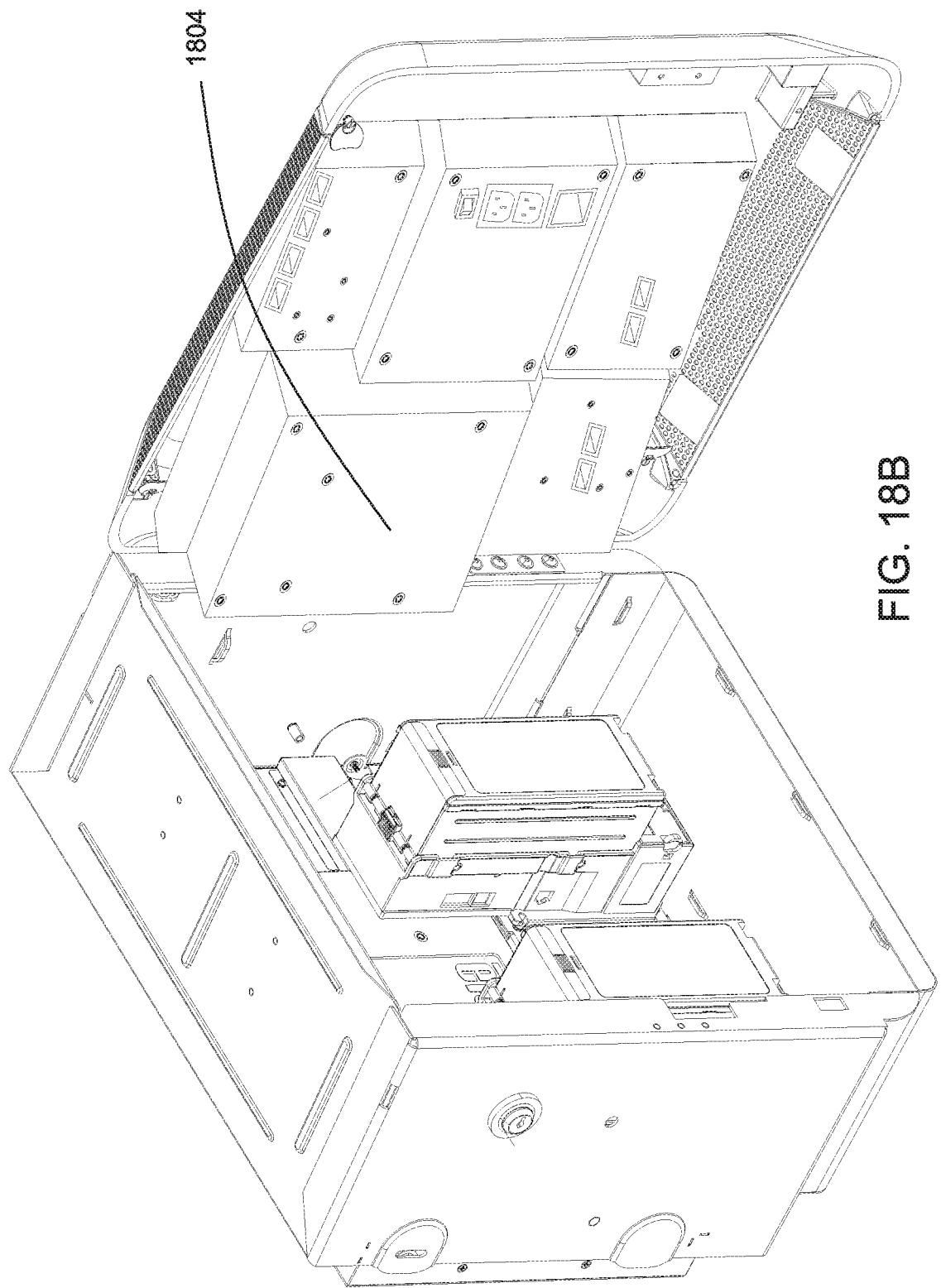

FIG. 18 (FIG. 18A and FIG. 18B) is a view of the jukebox chassis with the lock 1122 unlocked and the front panel opened 1026, according to some embodiments. The rear panel 1024 includes all, or almost all electronics and storage components that are used in the playing of jukebox audio. The rear panel comprises modular components of the various audio processing components, video processing components, storage components, network and communication components, power components, arranged in modular components in the rear panel. In some embodiments, the rear panel arrangement is such that no power cables are visible within the rear panel. FIG. 18A shows the rear panel 1024 without the processing circuitry and other modular components. FIG. 18B shows the rear panel 1024 with the processing circuitry and other modular components (see 1804).

The front panel 1026 of the chassis is in an open position in FIG. 18, after having been opened. It is noted that the front panel 1026 rotates on one side with respect to the rear panel 1024. The power outlets on the rear panel can be used to power up the components in the chassis or front panel.

The rear panel 1024, in pluggable and/or snap-on components, includes a computer with at least one processor, memory, storage, communication interface(s), input device (s), and communication infrastructure.

Processor(s) may include one or more of a central processing unit, digital signal processor, ASIC, graphic processing unit, and/or other processor. Processor(s) operate to execute one or more programs included in, for example, application code.

Memory may include volatile memory such as, for example, random access memory (RAM), and may include portions of application code and/or data during execution of programs by processor(s). Storage includes non-volatile memory such as, for example, magnetic and/or optical disk storage, and FLASH storage. Application code and/or data may be stored in storage. Communication interface(s) includes one or more of a network communication interface such as a wireless local area network interface, a Bluetooth interface, and/or near field communication interface. Communication interface(s) may provide for computer to communicate with another computer to exchange messages. Communication infrastructure provides for communication between components within computer.

In certain exemplary embodiments, payment may be processed using the techniques set forth in U.S. application Ser. No. 61/875,195, filed on Sep. 9, 2013, the entire contents of which are hereby incorporated by reference herein.

Figure 19:
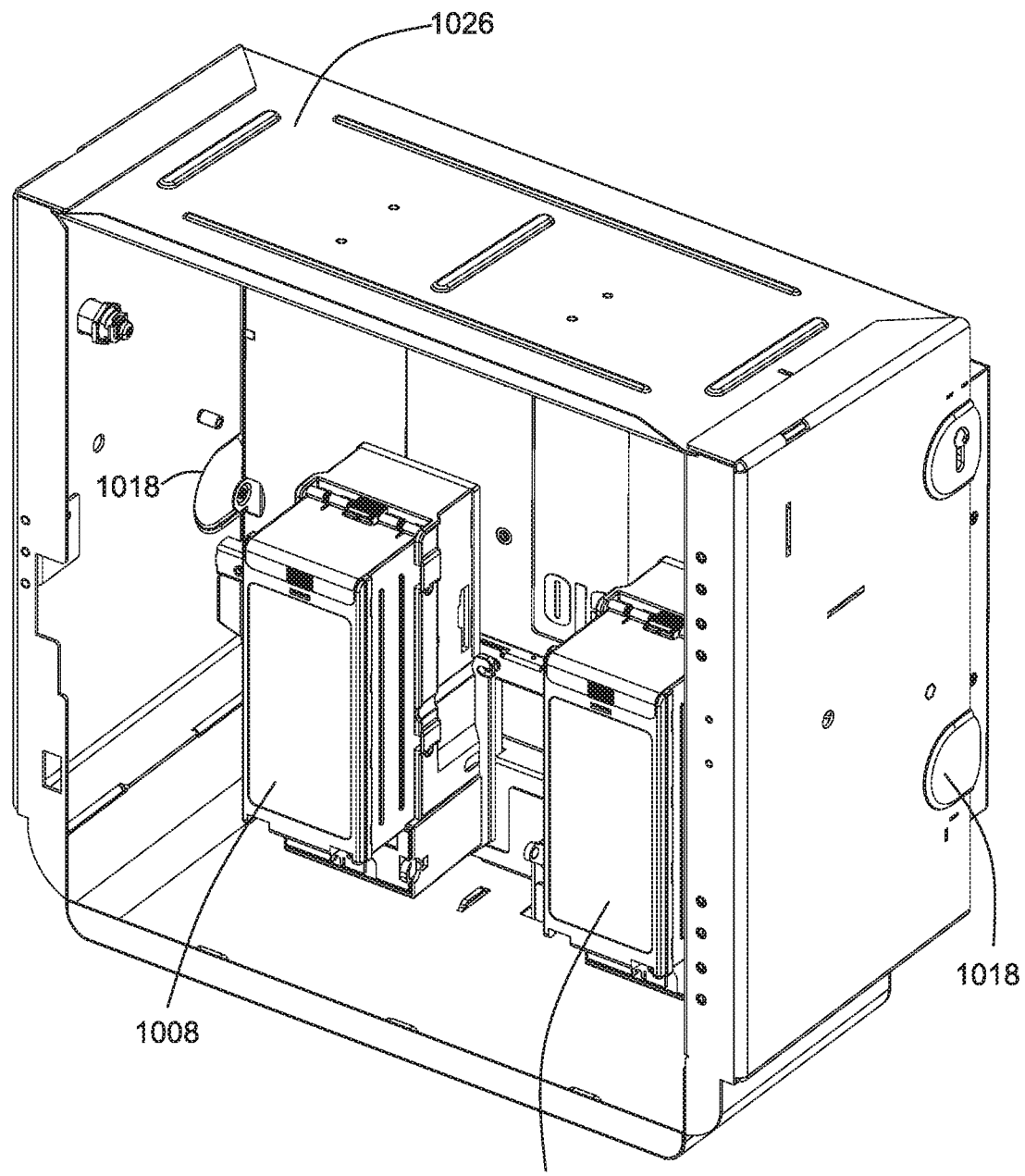
FIG. 19 is a rear perspective view of the front panel of the jukebox chassis, according to some embodiments.

FIG. 19 is a rear perspective view of the front panel of the jukebox chassis, according to some embodiments. In this view, according at least to some embodiments, it can be seen that when the display screen 1002 is opened only a portion of each payment collection device 1008 and 1006 are exposed to the operator. For example, this can be observed with respect to the vertical position of the tab 1018 in relation to the payment collection devices 1006 and 1008.

Figure 20:
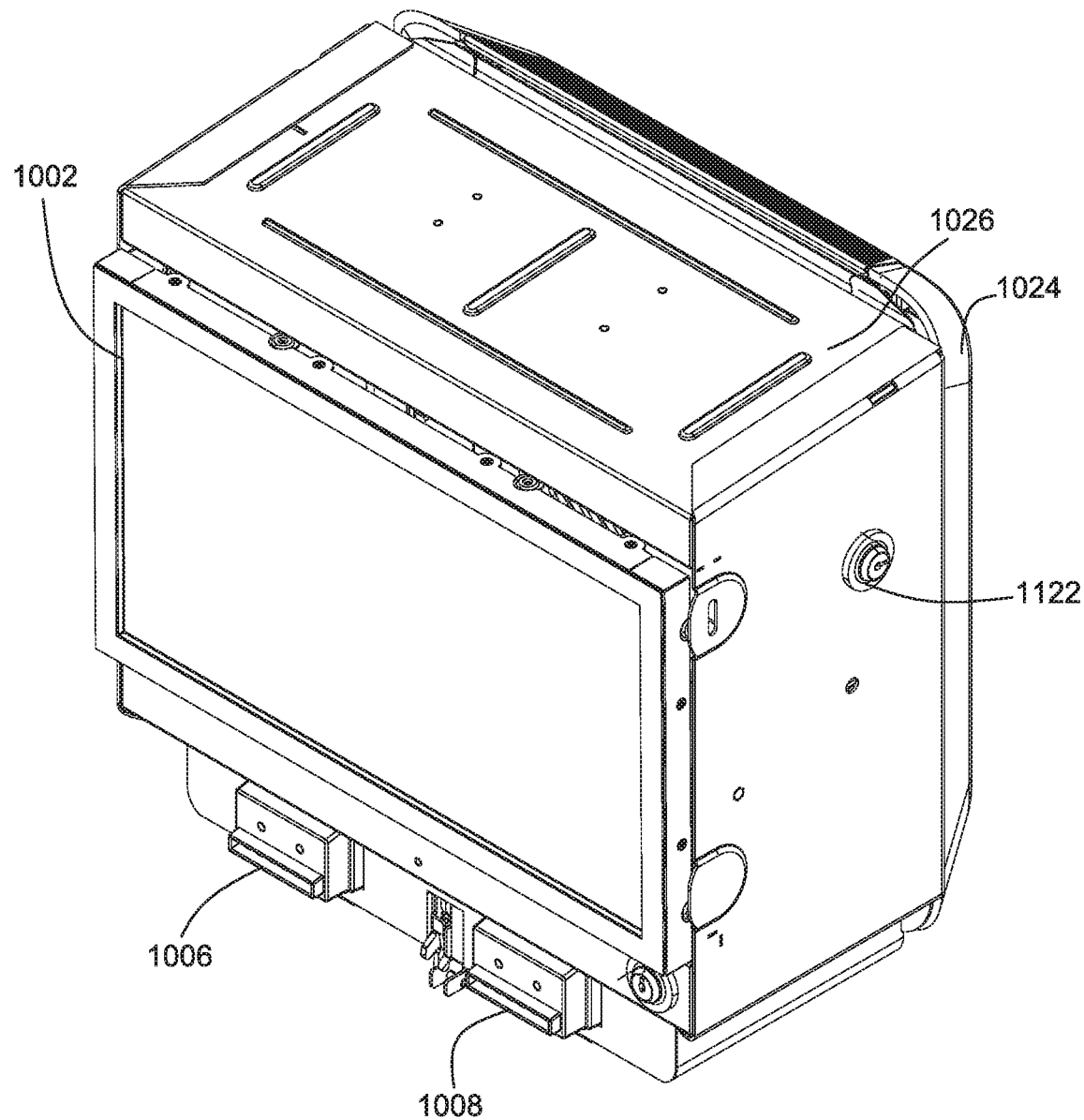
FIG. 20 is a front perspective view of the jukebox chassis, in accordance with certain exemplary embodiments.

FIG. 20 is a front perspective view of the jukebox chassis, in accordance with certain exemplary embodiments. The front perspective view clearly shows the positions of the locks 1010 and 1122 in relation to each other. The two locks 1010 and 1122 are positioned so that they are conveniently accessed from the same side. This may facilitate the positioning of the apparatus in space-limited quarters. As noted above, when the assembly containing the jukebox chassis 1000 is mounted on a wall, the lock 1010 is exposed to the user while lock 1122 is hidden from the user by the enclosure.

Figure 21:
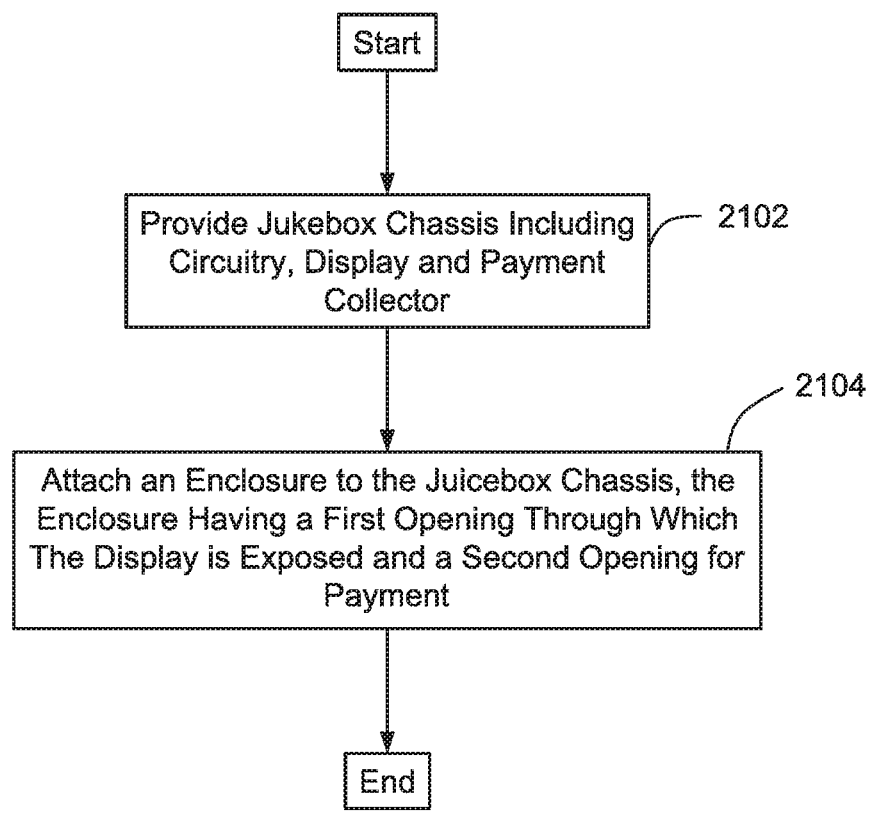
FIG. 21 is a method for providing a jukebox assembly such as that shown in FIG. 1, according to some embodiments.

FIG. 21 is a method 2100 for providing a jukebox assembly such as that shown in FIG. 1, according to some embodiments. According to some embodiments, the method 2100 requires a jukebox chassis, such as, for example, the jukebox chassis 1000 shown in FIG. 10, and an enclosure, such as, for example, the enclosure 104 as shown in FIG. 6.

At step 2102, the jukebox chassis and the enclosure are obtained, where they are configured to attach to each other.

At step 2104, the jukebox chassis is slide-on to the enclosure such that, at least in some embodiments, the front face of the enclosure is flush with the display screen 1002. When mounted, the display screen, and openings to receive money for pay-for-play services and the lock 1010 are exposed through the enclosure so that convenient access is provided to the user to select audio and/or video items through a touchscreen on the display screen and to input the coins or other funds as required for pay-for-play services.

The jukebox and cover assembly formed in step 2104 can be used to play audio and/or video items on a pay-for-play basis. The enclosure (cover) may be detachable in some embodiments, and when mounted has openings on its front face for the display screen of the jukebox chassis and payment acceptors, and a lock. Operators may have access to the payment collection device by opening the display screen without detaching or even loosening the enclosure. In some embodiments, access for payment collection may be provided by opening the display screen which may be configured as a door to a portion of the jukebox chassis.

Figure 22:
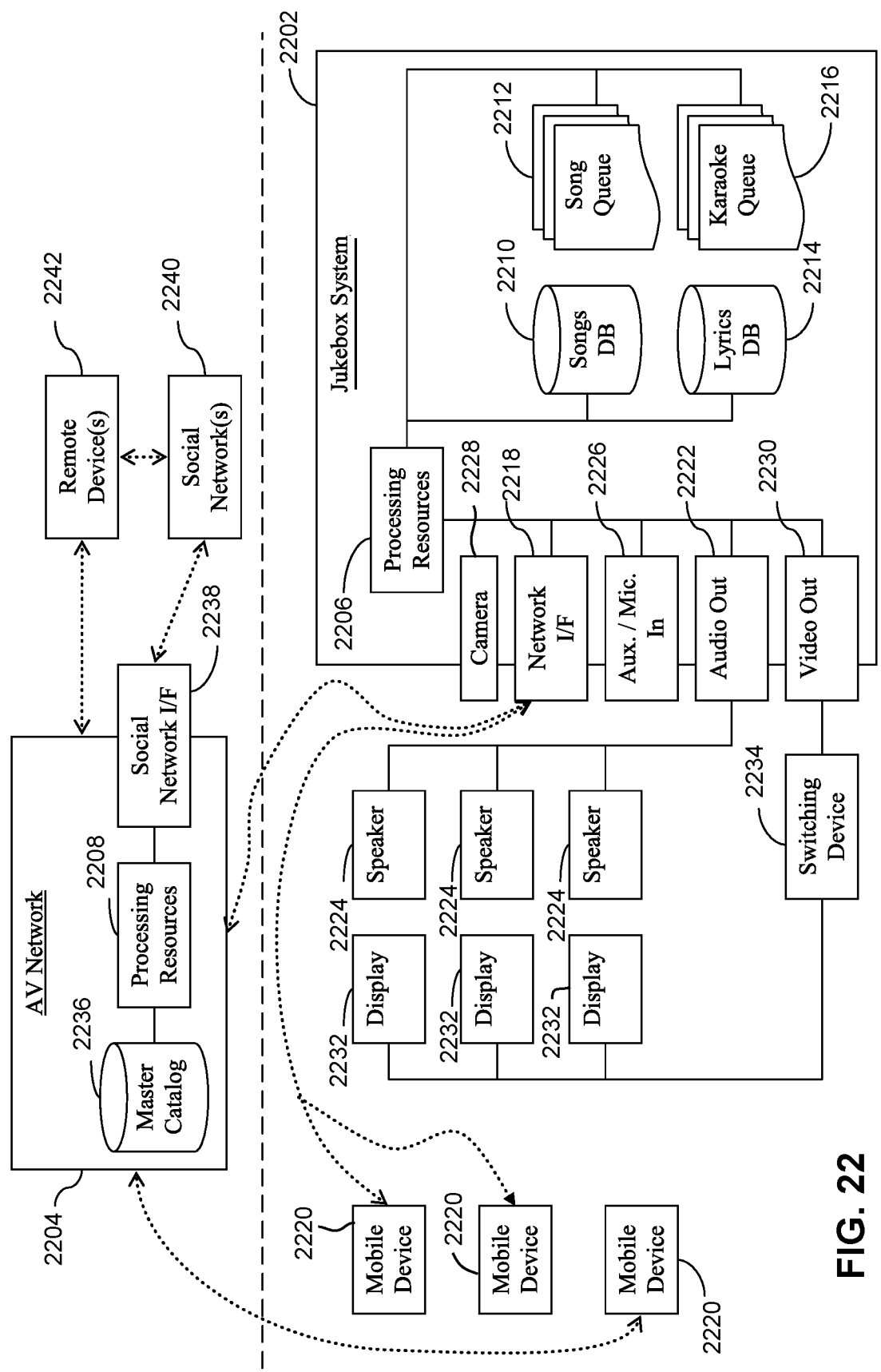
FIG. 22 is a jukebox system such as that shown the assembly of FIG. 1 and associated audio visual networks and devices, according to some example embodiments.

FIG. 22 is a jukebox system such as that shown the assembly of FIG. 1 and associated audio visual networks and devices, according to some example embodiments. In some example embodiments, the jukebox chassis 1000 may include and/or control a jukebox system such as jukebox system 2202.

The jukebox system 2202 may include processing resources (e.g. one or more processors, volatile memory, non-volatile storage) 2206 that are coupled to and that control one or more network interfaces 2218, one or more audio out interfaces 2222 and one or more viewo out interfaces 2230. The memory and/or storage of the processing resources 2206 may store an audio and/or video database 2210 which includes multiple digitized audio and/or video items for playback over the audio and/or video out interfaces. A memory may also include one or more queues 2212 which hold the audio and/or video items that have been selected for playback. The one or more audio out interfaces 2222 are connected to one or more speakers 2224 and the one or more video out interfaces 2230 are connected to one or more display screens 2232. It should be noted that in some embodiments a switching device 2234 may be used to selectively transmit video to the one or more displays 2232. In example embodiments at least one display 2232 may be integrated into the jukebox chassis, for example, such as the display screen 1002 of jukebox chassis 1000. Also, in some embodiments one or more speakers 2224 is integrated in the jukebox chassis such as jukebox chassis 1000. It should be noted that the audio out interfaces 2222 and video out interfaces 2230 may include any combination of pluggable or integrated (e.g. non-pluggable) interfaces. For example, in some embodiments, a jukebox chassis may, in addition to the integrated display screen and/or speaker(s) also include pluggable audio and/or video interfaces that can connect to external speakers and/or displays. In some embodiments, the only supported displays and speakers may be integrated onto the chassis.

The one or more network interfaces 2218 communicatively couples the jukebox system 2202 to an audio/video network 2204 which may include a master catalog of audio and/o video items 2236, processing resources 2208 of one or more servers, and a social network interface 2238. The master catalog 2236 may be used by the jukebox system 2202 to obtain audio and/or video items for playback. The items may be downloaded completely to the jukebox system 2202 before playback or may be streamed from the audio/video network 2204. The social network interface 2238 enables the jukebox system 2202 and/or other components of the audio/video network 2204 to connect to one or more social media platforms 2240. Such connections may enable users of the jukebox system 2202 to post information regarding and/or receive recommendations regarding items available for play back on the jukebox system 2202.

Mobile devices (e.g. smartphones, smartwatches, personal digital assistants, tablet computers, etc.) 2220 may access the jukebox system 2202 via wireless connectivity through the one or more network interfaces 2218. For example, a user (e.g. patron or operator) may utilize an app on his or her own mobile device to interact with the jukebox system 2202 in order to select one or more items for playback, to make any required payments for the playback, perform any modifications to the initial selections, and/or to engage in social media communications in relating to the playback items via the jukebox system 2202 and/or audio/video network 2204. In some embodiments, the jukebox system 2202 may support access and playback requests from one or more remote devices 2242. For example, the remote devices (e.g. smartphones/computers of users who are physically not at the same venue or location as jukebox system 2202) 2242 may connect to the jukebox system 2202 through audio/video network 2204 and the one or more network interfaces 2218.

In some embodiments, a camera 2228 may be integrated into the jukebox chassis. For example, a camera may be incorporated to the display screen of the jukebox chassis. In some embodiments, a camera may be incorporated as another component of the chassis which is exposed separately on the front surface of the enclosure attached to the jukebox chassis. The camera may be used to obtain images of the user and/or surroundings which may be incorporated into the images displayed on the display screen of the jukebox system and/or to be associated with any social media posts etc. In some embodiments, the camera may be used to detect the lighting conditions in the current environment in which the jukebox system 2202 is deployed, so that lighting etc. that is incorporated in the jukebox system 2202 can be changed and/or adjusted in accordance with the surrounding environment. In some embodiments, the camera 2228 may not be integrated in the jukebox chassis, but may be located externally to the chassis (e.g. on the enclosure that may be attached to the chassis) and connected as a plugin.

In some embodiments, one or more microphones 2226 may be either integrated and/or connected as plugins to the jukebox chassis. The one or more microphones may be used to receive user commands for things such as but not limited to selections of playback items, control of playback items in the one or more queues 2212, control of playback characteristics such as volume, and the like. In some embodiments in which one or more microphone is available to the jukebox system 2202, the jukebox system and its memory and storage may include a lyrics database 2214, and may also include one or more queues 2216 for karaoke songs. Further description of the operation of jukebox system 2202 can be found, for example, in relation to FIG. 3 of U.S. application Ser. No. 61/875,195. As noted above, the entire content of U.S. application Ser. No. 61/875,195, filed on Sep. 9, 2013, is herein incorporated by reference.

Some embodiments provide a wall-mountable jukebox system which includes (a) a jukebox chassis comprising digital jukebox processing circuitry and storage, a display screen and at least one payment collection device; and (b) an enclosure for the jukebox chassis, the enclosure having a first opening through which the display screen is exposed and a second opening for inserting payment into the at least one payment collection device. The jukebox chassis may be arranged in the enclosure.

The wall-mountable jukebox system described in the above paragraph may be configured such that the enclosure is detachable from the jukebox chassis.

The wall-mountable jukebox system according to any of the above two paragraphs, may be configured such that the jukebox chassis and the enclosure enable the jukebox chassis to be slid on to the enclosure, wherein a plurality of supports incorporated in to the inner surface enclosure facilitates the sliding on of the jukebox chassis.

The wall-mountable jukebox system according to the immediately preceding paragraph, wherein the plurality of supports are constructed on a rim of flexible material such that the slid-on chassis is firmly held by at least the plurality of supports.

The wall-mountable jukebox system according to any of the immediately preceding four paragraphs may be configured such that the jukebox chassis comprises a front panel including the display screen and the payment collection device, and a rear panel including the digital jukebox processing circuitry, storage, and communication circuitry.

The wall-mountable jukebox system according to any of the immediately preceding five paragraphs may be configured such that components of the jukebox chassis exposed by openings in the enclosure are limited to the display screen, access to one or more payment collection devices including the payment collection device and a lock.

The wall-mountable jukebox system according to any of the immediately preceding six paragraphs may be configured such that the jukebox chassis comprises a defined border surrounding the display screen, wherein the defined border includes a plurality of lights configured to vary one or more patterns and/or colors of lights in response to selected characteristics of music currently being played on the jukebox and/or in response to the ambient noise in a location at which the device is mounted.

The wall-mountable jukebox system according to the immediately preceding paragraph, may be configured such that the plurality of lights include LED lights.

The wall-mountable jukebox system according to according to either of the immediately preceding two paragraphs, may be configured such that the varying is in response to audio captured by a microphone.

The wall-mountable jukebox system according to any of the immediately preceding nine paragraphs may be configured such that the jukebox chassis comprises a first payment collection device and a second payment collection device, each being configured to receive payment through respective exposed areas in the front surface of the enclosure.

The wall-mountable jukebox system according to the immediately preceding paragraph, may be configured such that the first payment collection device is configured for coins and/or paper currency notes and the second payment collection device is configured for credit/debit cards.

The wall-mountable jukebox system according the immediately preceding two paragraphs, may be configured such that the digital jukebox processing circuitry is further configured to receive online payment for songs to be played by the jukebox system.

The wall-mountable jukebox system according to any of the immediately preceding twelve paragraphs may be configured such that the jukebox chassis further comprises a lock configured to secure the enclosure to the jukebox chassis.

The wall-mountable jukebox system according to the immediately preceding paragraph may be configured such that the enclosure includes a third opening through which the lock is accessed by a user.

The wall-mountable jukebox system according to any of the immediately preceding fourteen paragraphs may be configured such that the jukebox chassis further comprises a lock configured to secure a door which, when opened, provides access to the at least one payment collection device.

The wall-mountable jukebox system according to the immediately preceding paragraph may be configured such that the display screen is incorporated into the door, and wherein the jukebox system is configured to enable the door to be opened while the enclosure is attached to the jukebox chassis.

The wall-mountable jukebox system according to the immediately preceding two paragraphs may be configured such that the door is configured to swing upwards when being opened.

The wall-mountable jukebox system according to the immediately preceding three paragraphs may be configured such that opening the door provides access to the payment collection device.

The wall-mountable jukebox system according to the immediately preceding paragraph may be configured such that the provided access is only to the payment collection device.

The wall-mountable jukebox system according to the immediately preceding two paragraphs may be configured such that the provided access does not include access to the digital jukebox processing circuitry and the storage.

The wall-mountable jukebox system according to any of the immediately preceding twenty paragraphs may be configured such that the door is configured to, when opening, partially recess into the jukebox chassis and using a cantilever movement enabled by hinges and/or latches holding the display screen, articulate upwards.

The wall-mountable jukebox system according to claim 21, wherein the door, when closed, remains substantially flush with the front surface of the enclosure.

The wall-mountable jukebox system according to any of the immediately preceding twenty two paragraphs may be configured such that the first lock, when in locked position secures the door flush to the front surface of the enclosure and, when not in the locked position, releases the door for opening and releases the enclosure for detaching from the jukebox chassis.

The wall-mountable jukebox system according to any of the immediately preceding twenty three paragraphs may be configured such that the jukebox chassis includes a side-locking swing door which, when opened, provides maintenance access to components of the digital jukebox.

The wall-mountable jukebox system according to claim 24, wherein a second lock on the side-locking swing-door is shielded from view and access by the enclosure when mounted on a wall.

The wall-mountable jukebox system according to any of the immediately preceding twenty five paragraphs may be configured such that the digital jukebox processing circuitry is configured to communicate with a mobile application executing on a handheld device.

The wall-mountable jukebox system according to claim 26, wherein the mobile application enables users to control music played on the jukebox processing circuitry from their handheld devices and enables venues hosting the jukebox system to send welcome messages to said users.

The wall-mountable jukebox system according to any of the immediately preceding twenty seven paragraphs may be configured such that the display screen includes a touchscreen.

The wall-mountable jukebox system according to any of the immediately preceding twenty eight paragraphs may be configured such that the enclosure is constructed from a wooden barrel.

The wall-mountable jukebox system according to any of the immediately preceding twenty nine paragraphs may be configured such that the enclosure is customizable.

Some embodiments provide a method of providing a wall-mountable jukebox system comprising: providing a jukebox chassis comprising digital jukebox processing circuitry, a display screen and a payment collection device; and attaching an enclosure for the digital jukebox chassis, the enclosure having a first opening through which the display screen is shown and a second opening for inserting payment into the payment collection device.

Some embodiments provide a digital jukebox comprising: a jukebox chassis configured to be wall mounted; digital jukebox processing circuitry enclosed in the jukebox chassis; at least one payment collection device enclosed in the jukebox chassis; and a display screen connected to the jukebox chassis and configured such that access to at least the payment collection device is provided by moving the display screen.

The digital jukebox according to the immediately preceding paragraph may be configured to further comprise a lock to secure the display screen to the jukebox chassis.

The digital jukebox according to the two immediately preceding paragraphs may be configured such that the display screen is integrated to a door of the jukebox chassis.

The digital jukebox according to the immediately preceding three paragraphs may be configured such that the jukebox chassis is further configured to be surrounded by an enclosure when mounted on a wall such that the display screen is exposed through an opening of the enclosure.

Some embodiments provide a wall-mountable jukebox system enclosure comprising, on a front facing surface, a first opening to expose a display screen of a digital jukebox and a second opening to provide access to a payment collection device, wherein the system enclosure is detachably-attached to the digital jukebox.

While certain aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

We claim:

1. A wall-mountable jukebox system comprising:
a jukebox chassis comprising digital jukebox processing circuitry and storage, a display screen and at least one payment collection device, the jukebox chassis having a front surface on which the display screen and the at least one payment device are arranged, a back surface and side surfaces; and
an enclosure for the jukebox chassis, the enclosure having a first opening through which the display screen is exposed and a second opening for inserting payment into the at least one payment collection device,
wherein when the jukebox chassis is arranged in a space volume within the enclosure and the jukebox chassis is wall-mounted, the enclosure surrounds all the side surfaces and the front surface of the jukebox chassis without surrounding the back surface of the jukebox chassis,
wherein the jukebox chassis further comprises a lock configured to, when locked, secure the enclosure to the jukebox chassis and to, when unlocked, provide for the enclosure to be detached from the jukebox chassis, and
wherein components of the jukebox chassis exposed by openings in the enclosure are limited to the display screen, access to payment inputs to one or more payment collection devices including the payment collection device and the lock.

2. The wall-mountable jukebox system according to claim 1, wherein the enclosure is configured to be detachable from the jukebox chassis.

3. The wall-mountable jukebox system according to claim 1, wherein the jukebox chassis and the enclosure are configured to enable the jukebox chassis to be slid on to the enclosure, wherein a plurality of supports incorporated in to an inner surface of the enclosure facilitates the sliding on of the jukebox chassis.

4. The wall-mountable jukebox system according to claim 1, wherein the jukebox chassis comprises a front panel including the display screen and the payment collection device, and a rear panel including the digital jukebox processing circuitry, the storage, and a communication circuitry.

5. The wall-mountable jukebox system according to claim 1, wherein the jukebox chassis comprises a defined border surrounding the display screen, wherein the defined border includes a plurality of lights configured to vary one or more patterns and/or colors of lights in response to selected characteristics of music currently being played on the jukebox and/or in response to the ambient noise in a location at which the jukebox system is mounted.

6. The wall-mountable jukebox system according to claim 1, wherein the digital jukebox processing circuitry is further configured to receive online payment for audio or video item to be played by the jukebox system.

7. The wall-mountable jukebox system according to claim 1, wherein the enclosure includes a third opening through which the lock is accessed by a user.

8. The wall-mountable jukebox system according to claim 1, wherein the lock configured to secure a door which, when opened, provides access to the at least one payment collection device.

9. The wall-mountable jukebox system according to claim 8, wherein the display screen is incorporated into the door, and wherein the jukebox system is configured to enable the door to be opened while the enclosure is attached to the jukebox chassis.

10. The wall-mountable jukebox system according to claim 9, wherein opening the door provides access to the payment collection device without providing access to the digital jukebox processing circuitry and the storage.

11. The wall-mountable jukebox system according to claim 9, wherein the door, when closed, remains substantially flush with the front surface of the enclosure, and wherein the door is configured to, when opening, partially recess into the jukebox chassis and using a cantilever movement enabled by hinges and/or latches holding the display screen, articulate upwards.

12. The wall-mountable jukebox system according to claim 9, wherein the lock, when in locked position secures the door flush to the front surface of the enclosure and when not in the locked position, releases the door for opening and releases the enclosure for detaching from the jukebox chassis.

13. The wall-mountable jukebox system according to claim 1, wherein the jukebox chassis includes a side-locking swing door which, when opened, provides maintenance access to components of the jukebox chassis.

14. The wall-mountable jukebox system according to claim 13, wherein a lock on the side-locking swing-door is shielded from view and access by the enclosure when mounted on a wall.

15. The wall-mountable jukebox system according to claim 1, wherein a mobile application enables a mobile device to control music played on the jukebox processing circuitry and is configured to receive messages from the jukebox system.

16. The wall-mountable jukebox system according to claim 1, wherein the enclosure is constructed from a wooden barrel.

17. A method of providing a wall-mountable jukebox system comprising:
providing a jukebox chassis comprising digital jukebox processing circuitry, a display screen and at least one payment collection device, the jukebox chassis having a front surface on which the display screen and the at least one payment device are arranged, a back surface and side surfaces; and
attaching an enclosure for the digital jukebox chassis, the enclosure having a first opening through which the display screen is exposed and a second opening for inserting payment into the payment collection device,
wherein the enclosure is detachable from the jukebox chassis,
wherein when the jukebox chassis is arranged in a space volume within the enclosure and the jukebox chassis is wall-mounted, the enclosure surrounds all the side surfaces and the front surface of the jukebox chassis without surrounding the back surface,
wherein the jukebox chassis further comprises a lock configured to, when locked, secure the enclosure to the jukebox chassis and to, when unlocked, providing for the enclosure to be detached from the jukebox chassis, and
wherein components of the jukebox chassis exposed by openings in the enclosure are limited to the display screen, access to payment inputs to one or more payment collection devices including the payment collection device and the lock.

18. A digital jukebox comprising:
a jukebox chassis configured to be wall mounted;
digital jukebox processing circuitry enclosed in the jukebox chassis;
at least one payment collection device enclosed in the jukebox chassis; and
a display screen connected to the jukebox chassis and configured such that access to at least the payment collection device is provided by moving the display screen,
wherein the jukebox chassis is further configured to be surrounded on all sides except for the back side by an enclosure when mounted on a wall such that the display screen is exposed through an opening of the enclosure
wherein the enclosure is detachable from the jukebox chassis,
wherein the jukebox chassis comprises a lock configured to, when locked, secure the enclosure to the jukebox chassis and to, when unlocked, providing for the enclosure to be detached from the jukebox chassis, and
wherein components of the jukebox chassis exposed by openings in the enclosure are limited to the display screen, access to payment inputs to one or more payment collection devices including the payment collection device and the lock.

19. The digital jukebox according to claim 18, further comprising another lock to secure the display screen to the jukebox chassis.

20. The digital jukebox according to claim 18, wherein the display screen is integrated to a door of the jukebox chassis.

* * * * *